(12) United States Patent
Sorenson, Jr.

(10) Patent No.: US 7,141,170 B2
(45) Date of Patent: Nov. 28, 2006

(54) HALOGENATED SOLVENT REMEDIATION

(75) Inventor: Kent S. Sorenson, Jr., Erie, CO (US)

(73) Assignee: North Wind, Inc., Idaho Falls, ID (US)

( * ) Notice: Subject to any disclaimer, the term of this patent is extended or adjusted under 35 U.S.C. 154(b) by 48 days.

(21) Appl. No.: 11/042,350

(22) Filed: Jan. 24, 2005

(65) Prior Publication Data

US 2005/0263454 A1    Dec. 1, 2005

Related U.S. Application Data

(63) Continuation of application No. 10/853,899, filed on May 25, 2004, now abandoned.

(51) Int. Cl.
*C02F 3/00* (2006.01)
(52) U.S. Cl. ..................... 210/610
(58) Field of Classification Search ............. 210/610
See application file for complete search history.

(56) References Cited

U.S. PATENT DOCUMENTS

| | | | |
|---|---|---|---|
| 6,322,700 B1 * | 11/2001 | Suthersan | 210/610 |
| 6,632,364 B1 * | 10/2003 | Suthersan | 210/610 |
| 6,783,678 B1 * | 8/2004 | Sorenson | 210/610 |
| 2004/0157317 A1 * | 8/2004 | Sorenson et al. | 435/262.5 |

OTHER PUBLICATIONS

"Remediation Kiosk: Realities of enhanced reductive dechlorination" (Apr. 2003) published at http://www.pollutionengineering.com/CDA/ArticleInformation/features/BNP_Features_Item/0,6649,108263,00.html.*
Technical Protocol for Using Soluble Carbohydrates to Enhance Reductive Dechlorination of Chlorinated Aliphatic Hydrocarbons, p. 1-13 (Dec. 2002) (whey as an electron donor at p. 1), see www.estcp.org/viewfile.cfm?doc=CU-9920-PR-01.pdf.*

* cited by examiner

*Primary Examiner*—Chester T Barry
(74) *Attorney, Agent, or Firm*—Clayton, Howarth & Cannon, P.C.

(57) ABSTRACT

Methods for enhancing bioremediation of ground water contaminated with nonaqueous halogenated solvents are disclosed. An illustrative method includes adding a composition to the ground water wherein the composition is an electron donor for microbe-mediated reductive dehalogenation of the halogenated solvents and enhances mass transfer of the halogenated solvents from residual source areas into the aqueous phase of the ground water. Illustrative compositions effective in these methods include whey powder, liquid whey, and mixtures of ethyl lactate and $C_2$ or higher carboxylic acids or hydroxy acids, salts thereof, esters thereof, or mixtures thereof.

5 Claims, 8 Drawing Sheets

HALOGENATED SOLVENT REMEDIATION

CROSS-REFERENCE TO RELATED APPLICATIONS

This application is a continuation of co-pending U.S. patent application Ser. No. 10/853,899, filed May 25, 2004, now abandoned entitled "Halogenated Solvent Remediaiton," which is incorporated herein by reference in its entirety, including but not limited to those portions that specifically appear hereinafter, the incorporation by reference being made with the following exception: In the event that any portion of the above-referenced application is inconsistent with this application, this application supercedes said above-referenced application.

STATEMENT REGARDING FEDERALLY SPONSORED RESEARCH OR DEVELOPMENT

Not applicable.

BACKGROUND OF THE INVENTION

This invention relates to remediation of environmental contamination. More particularly, the invention relates to methods for accelerating or enhancing in situ dehalogenation of nonaqueous halogenated solvents in ground water. These methods involve adding to the contaminated ground water a composition of matter that both functions as an electron donor for halorespiration processes carried out by indigenous or exogenously supplied bacteria, wherein the nonaqueous halogenated solvents are dehalogenated and degraded to innocuous compounds, and promotes mass transfer of the nonaqueous halogenated solvents from a source into the ground water where such solvents can be broken down.

For many years little care was taken in the handling of organic solvents and other materials that were used in industry and at government installations, such as military bases. Because of poor handling techniques and, occasionally, intentional dumping, many industrial sites and military bases now have contaminated areas containing relatively high concentrations of these contaminants. Chlorinated solvents, such as trichloroethylene (TCE), perchloroethylene (PCE), and other types of liquids, are common at such sites, and if not removed can infiltrate groundwater supplies, rendering the water unfit for consumption and other uses.

A variety of techniques have been used to promote the removal of such chemical contaminants, both from the soil and from the ground water. The principle method of ground water remediation currently used where dense, non-aqueous phase liquids (DNAPLs) are involved is what is commonly referred to as "pump-and-treat" remediation. According to this method, wells are drilled into the contaminated area and contaminated ground water is pumped above the surface, where it is treated to remove the contaminants.

The limitations of the pump-and-treat method have been documented in articles such as D. M. Mackay & J. A. Cherry, Groundwater Contamination: Pump and Treat Remediation, 23 Environ. Sci. Technol. 630–636 (1989). The authors of this article concluded that pump-and-treat remediation can only be relied on to contain ground water contamination through the manipulation of hydraulic gradients within an aquifer. The reasons for the failure of the pump-and-treat method to decontaminate aquifers are rooted in the limited aqueous solubility of many DNAPLs in ground water and other processes involving contaminant desorption and diffusion. Because of the low aqueous solubility of most DNAPLs, their removal by ground water extraction requires exceptionally long periods of time.

Due to the general impracticability of the pump-and-treat method, considerable attention has been paid recently to other methods for effecting remediation. One such process is commonly referred to as enhanced solubilization. This method uses micellar surfactants to increase the effective solubility of the DNAPLs to accelerate the rate of removal. The mechanism of solubilization displayed by surfactants arises from the formation of microemulsions by the surfactants, water, and the solubilized DNAPLs. For example, Table 1 shows solubilization of PCE by various nonionic and anionic surfactants. These data indicate that even dilute surfactants can significantly increase the aqueous solubility of PCE.

TABLE 1

| Surfactant | Surfactant Concentration | PCE Solubilized (mg/l) |
|---|---|---|
| Water | 0% | 240 |
| Nonylphenol ethoxylate and its phosphate ester (1:1) | 2% | 11,700 |
| Sodium diamyl and dioctyl sulfosuccinates (1:1) in 500 mg $CaCl_2/l$ | 4% | 85,000 |
| Nonylphenol ethoxylate | 1% | 1,300 |

A serious drawback with the surfactant-enhanced aquifer remediation is that the vertical mobility of the solubilized DNAPLs substantially requires that an aquiclude be present to catch any solubilized contaminant that migrates vertically. Many aquifers, however, lack such an aquiclude. If the traditional surfactant-enhanced aquifer remediation method were to be used with an aquifer lacking an aquiclude, there is a significant risk that the solubilized DNAPLs will spread vertically and contaminate an increasingly large volume. Another drawback of surfactant-enhanced aquifer remediation is the need to pump high concentrations of contaminated water above ground, which results in exposure risks to workers and the environment, and the need to dispose or recycle the surfactant.

Another method for effecting remediation of ground water contaminated with DNAPLs is known as enhanced bioremediation. Enhanced bioremediation, as opposed to intrinsic bioremediation, of halogenated solvent-contaminated ground water falls into the two broad categories of aerobic and anaerobic bioremediation. The aerobic processes, regardless of whether they are carried out in situ or in a bioreactor, require addition of (1) oxygen as the electron acceptor for catabolism of the halogenated solvents, and (2) a carbon source, such as methane, propane, phenol, toluene, or butane. The utilization of an appropriate carbon source induces an enzyme that fortuitously degrades many halogenated solvents, but without any immediate benefit to the microorganisms involved. This process has been applied in situ to aqueous contamination in several instances, and at least one patent has been granted for this approach (U.S. Pat. No. 5,384,048). It has also been used to treat aqueous contamination in above-ground bioreactors with numerous variations, especially using proprietary microorganisms and nutrient mixes. Many patents have been granted in this area, e.g., U.S. Pat. No. 5,057,221; U.S. Pat. No. 5,962,305; U.S. Pat. No. 5,945,331.

Anaerobic bioremediation of halogenated solvents is a fundamentally different process than aerobic bioremediation. Under appropriate anaerobic conditions, chlorinated solvents can be used directly by some microorganisms as electron acceptors through a process that has come to be known as "chlororespiration," or, more generally, "halorespiration." D. L. Freedman & J. M. Gossett, Biological Reductive Dechlorination of Tetrachloroethylene and Trichloroethylene to Ethylene Under Methanogenic Conditions, 55 Applied Environ. Microbiol. 2144–2155 (1989), first published the complete degradation pathway for chlorinated ethenes to ethene. In the following years, several publications reported evidence that the degradation could be achieved through microbial respiration, indicating that the microorganisms could actually grow by using chlorinated solvents directly as electron acceptors. The primary requirement to facilitate this process is the addition of a suitable electron donor or carbon source. Many electron donors have been described in the literature, including acetate, lactate, propionate, butyrate, formate, ethanol, hydrogen, and many others. U.S. Pat. No. 5,277,815 issued in 1994 for in situ electron donor addition along with control of redox conditions to effect the desired end products. U.S. Pat. No. 5,578,210 issued later for enhanced anaerobic in situ bioremediation using "biotransformation enhancing agents," i.e., electron donors such as propylene glycol, glycerol, glutamate, a mixture of proteose peptone, beef extract, yeast extract, malt extract, dextrose, and ascorbic acid, and mixtures thereof. Based primarily on what was publicly available in the scientific literature, studies of enhanced anaerobic in situ bioremediation of chlorinated solvents began in the mid-1990s. This approach generally includes electron donor addition, sometimes with other micronutrients, to facilitate biotransformation of aqueous-phase contaminants. To date, only a few large-scale studies have been published in the peer-reviewed literature, but environmental consulting companies and remediation contractors are increasingly using the general approach.

With one very recent exception, discussed below, all of the work done in this area to date has focused on the biodegradation of aqueous contaminants, because microorganisms cannot directly degrade nonaqueous contaminants. Consequently, bioremediation is not generally thought to be applicable to sites with residual DNAPLs in the subsurface. Therefore, the technologies currently in use include thermal technologies such as steam stripping, in situ chemical oxidation, surfactant flushing, or co-solvent flushing. Surfactant (or co-solvent) flushing, briefly described above, is a chemical process that aims to facilitate transport of nonaqueous contaminants, but without attention to biodegradation. At many sites, however, the pump-and-treat process continues to be used to hydraulically contain residual source areas although it is almost universally accepted that these systems will have to operate in perpetuity because of their inefficient removal of nonaqueous contaminants.

The notable recent exception to the focus of bioremediation on aqueous contaminants away from residual source areas is a study by C. S. Carr et al., Effect of Dechlorinating Bacteria on the Longevity and Composition of PCE-Containing Nonaqueous Phase Liquids under Equilibrium Dissolution Conditions, 34 Environ. Sci. Technol. 1088–1094 (2000), demonstrating that anaerobic bioremediation of tetrachloroethene (PCE) enhanced mass transfer from the nonaqueous phase to the aqueous phase and significantly shortened the longevity of the nonaqueous source. The mechanisms identified were (1) enhanced dissolution of PCE resulting from the continuous removal of the compound from the aqueous phase by bacteria, and (2) increased solubility of the intermediate chlorinated ethenes relative to PCE, allowing the total moles of chlorinated ethenes in the aqueous phase to increase due to biotransformation. This study is important because it identifies some of the advantages of enhancing mass transfer from the nonaqueous phase to the aqueous phase.

In view of the foregoing, it will be appreciated that providing methods for accelerating or enhancing in situ bioremediation of halogenated solvents in ground water would be a significant advancement in the art.

BRIEF SUMMARY OF THE INVENTION

It is an advantage of the present invention to provide a method for in situ remediation of DNAPLs in ground water wherein capital costs are low.

It is also an advantage of the invention to provide a method for in situ remediation of DNAPLs in ground water wherein mass transfer from the nonaqueous phase to the aqueous phase is enhanced.

It is another advantage of the invention to provide a method for in situ remediation of DNAPLs in ground water wherein the longevity of source areas is shortened.

It is still another advantage of the invention to provide a method for in situ remediation of DNAPLs in ground water wherein no extraction of contaminated water from the ground is required.

It is yet another advantage of the invention to provide a method for in situ remediation of DNAPLs in ground water such that the concentrations of the solvents are restored to below regulatory limits and no follow-on remediation activities, other than perhaps monitored natural attenuation, are needed.

It is a still further advantage of the invention to provide a method for in situ remediation of DNAPLs in ground water wherein the DNAPLs are more rapidly removed from the ground water than with prior art methods and residual source areas are removed.

It is another advantage of the invention to provide a method for in situ remediation of DNAPLs in ground water wherein transport is facilitated and bioavailability of nonaqueous halogenated solvents is enhanced.

It is still another advantage of the invention to provide a method for in situ remediation of DNAPLs in ground water wherein the method is sustainable for low cost and has low maintenance requirements.

It is yet another advantage of the invention to provide a method for in situ remediation of DNAPLs in ground water by adding a composition of matter that is both an electron donor and a surfactant or enhancer of mass transfer.

It is still further an advantage of the invention to provide a method for remediation of DNAPLs in ground water wherein destruction of the DNAPLs occurs in situ.

It is a yet further advantage of the invention to provide a method for in situ remediation of DNAPLs in ground water wherein an unobtrusive appearance is provided and it meets with public acceptance.

These and other advantages can be addressed by providing a method for enhancing in situ bioremediation of a nonaqueous halogenated solvent in ground water comprising adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein the electron donor enhances mass transfer of the nonaqueous halogenated solvents into solution. The electron donor ideally functions as a surfactant or co-solvent. In cases where the electron donor is a functional surfactant, it is typically added at a concentration above the critical micelle concentration in water. In cases where the electron donor is a functional co-solvent, there may be no critical micelle concentration, or if there is a critical micelle concentration in water, the electron donor is usually added at a concentration below such critical micelle concentration. Illustrative electron donors for use in this method include $C_2$–$C_4$ carboxylic acids and hydroxy acids, salts thereof, esters of $C_2$–$C_4$ carboxylic acids and hydroxy acids, and mixtures thereof. In an illustrative embodiment of the invention, the electron donor is a member selected from the group consisting of lactic acid, salts thereof, lactate esters, and mixtures thereof. Illustrative salts of lactic acid include sodium lactate, potassium lactate, lithium lactate, ammonium lactate, calcium lactate, magnesium lactate, manganese lactate, zinc lactate, ferrous lactate, aluminum lactate, and mixtures thereof. Illustrative targets of the method include nonaqueous chlorinated solvents, such as perchloroethylene (PCE), trichloroethylene (TCE), dichloroethylene (DCE), vinyl chloride (VC), 1,1,1-trichloroethane (TCA), carbon tetrachloride and less chlorinated derivatives thereof, and mixtures thereof. An illustrative aspect of the invention relates to enhancing the reductive dehalogenation activity of indigenous halo-respiring microbes present in the ground water. If halo-respiring microbes are absent or ineffective, then such microbes can be exogenously supplied to the ground water. Illustratively, the microbes are bacteria, such as *Dehalococcoides ethenogenes* strain 195, the Pinellas culture, and the like, and mixtures thereof. The method degrades the halogenated solvents into innocuous compounds such as ethylene, ethane, carbon dioxide, water, halogen salts, and mixtures thereof.

A method for enhancing mass transfer of a nonaqueous halogenated solvent present in a nonaqueous residual source of contamination into the aqueous phase comprises adding to the ground water an effective amount of a composition that donates electrons for reductive dehalogenation of the nonaqueous halogenated solvent and functions as a surfactant for solubilizing the nonaqueous halogenated solvent.

A method for enhancing in situ bioremediation of a nonaqueous halogenated solvent in ground water comprises adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein the electron donor comprises an aqueous solution of at least about 1% by weight of whey powder or equivalent of liquid whey or derivative thereof.

A method for enhancing in situ bioremediation of a nonaqueous halogenated solvent in ground water comprising adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein the electron donor comprises a mixture of (a) at least about 0.5% by weight of ethyl lactate and (b) at least about 0.5% by weight of a $C_2$ or higher carboxylic acid or hydroxy acid, salt thereof, ester thereof, or mixtures thereof. An illustrative embodiment of such mixture is a mixture of ethyl lactate and dipropionate, wherein dipropionate is a mixture of propionic acid and sodium propionate.

A method for enhancing mass transfer of a nonaqueous halogenated solvent present in a nonaqueous residual source of contamination in ground water, the ground water comprising an aqueous phase, into the aqueous phase comprising adding to the ground water an effective amount of a composition that donates electrons for microbe-mediated reductive dehalogenation of the nonaqueous halogenated solvent into innocuous compounds and functions as a surfactant or co-solvent for solubilizing the nonaqueous halogenated solvent, wherein the composition comprises (a) an aqueous solution of at least about 1% by weight of whey powder or equivalent of liquid whey, or (b) a mixture of at least about 0.5% by weight of ethyl lactate and at least about 0.5% by weight of a $C_2$ or higher carboxylic acid or hydroxy acid, salt thereof, ester thereof, or mixtures thereof.

BRIEF DESCRIPTION OF THE SEVERAL VIEWS OF THE DRAWINGS

FIG. 3A shows COD (solid line) and electron donor (broken line) concentrations in units of mg/L as a function of time in days. FIG. 3B shows ferrous iron (dotted line), sulfate (solid line), and methane (dashed line) concentrations in units of mg/L as a function of time in days. FIG. 3C shows TCE, cis-DCE, trans-DCE, VC, and ethene concentrations in units of μmol/L as a function of time in days.

0.7% dipropionate influent, (●) 10% ethyl lactate/7% dipropionate TCE, (■) tap water COD, (•) 10% ethyl lactate/7% dipropionate influent. Arrows show when addition of mixtures of ethyl lactate and dipropionate began and ceased.

Figure 10:
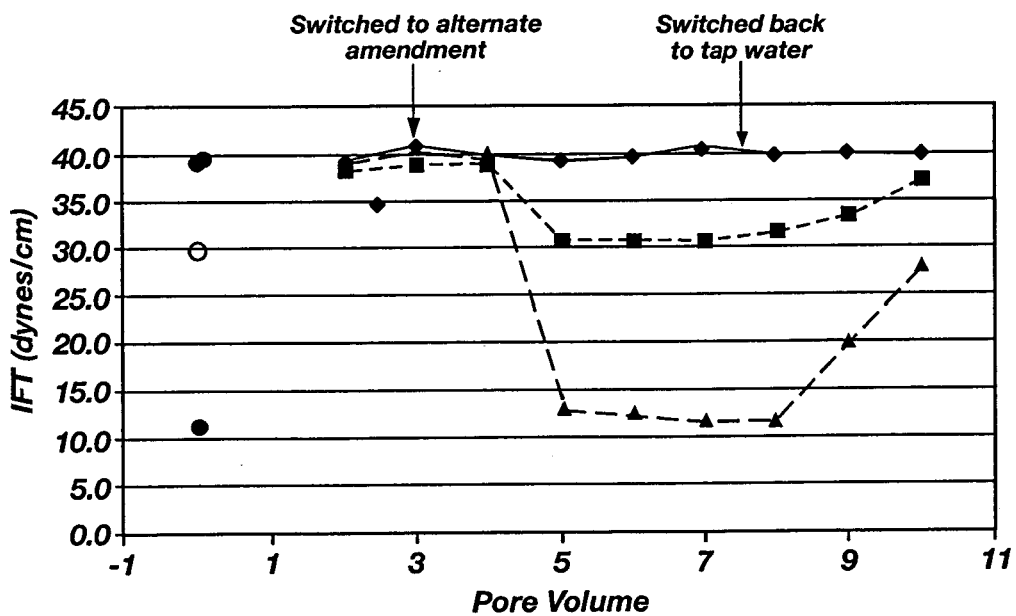

FIG. 10 shows interfacial tension measurements between column effluent/influent and TCE DNAPL during dipropionate/ethyl lactate amendment: (◆) tap water, (▲) 10% ethyl lactate/7% dipropionate, (●) influent 10% ethyl lactate/7% dipropionate, (■) 1% ethyl lactate/0.7% dipropionate, (○) influent 1% ethyl lactate/0.7% dipropionate, (●) tap water. Arrows show when addition of mixtures of ethyl lactate and dipropionate began and ceased.

Figure 11:
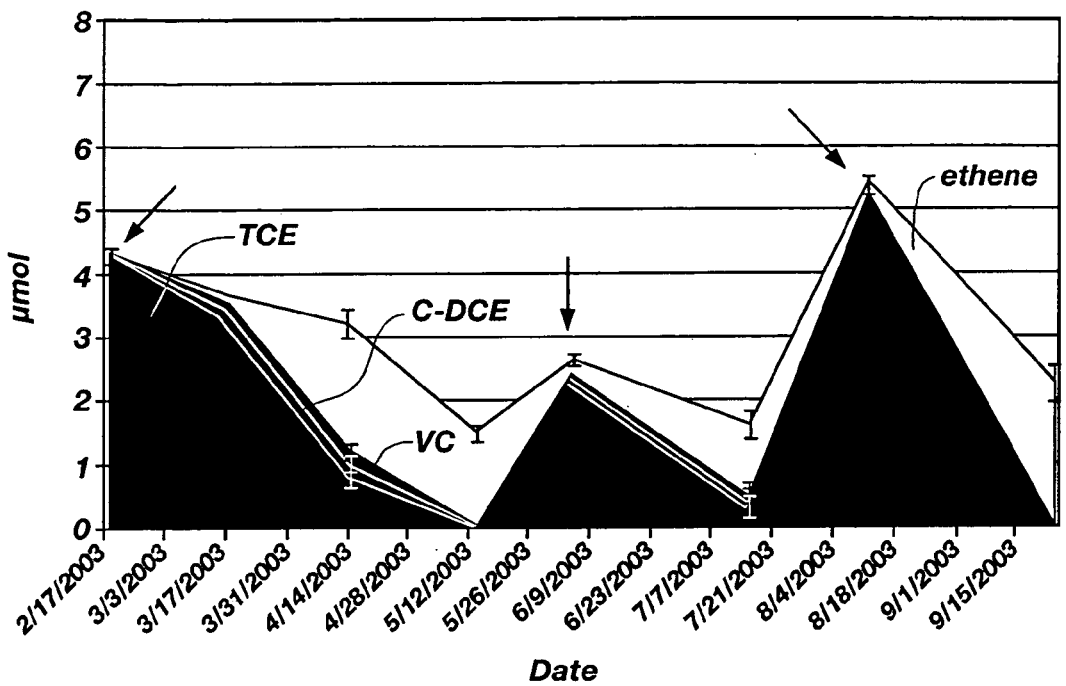

FIG. 11 shows an area plot of TCE dechlorination and daughter products in whey powder microcosms; arrows indicate addition of TCE.

Figure 12:
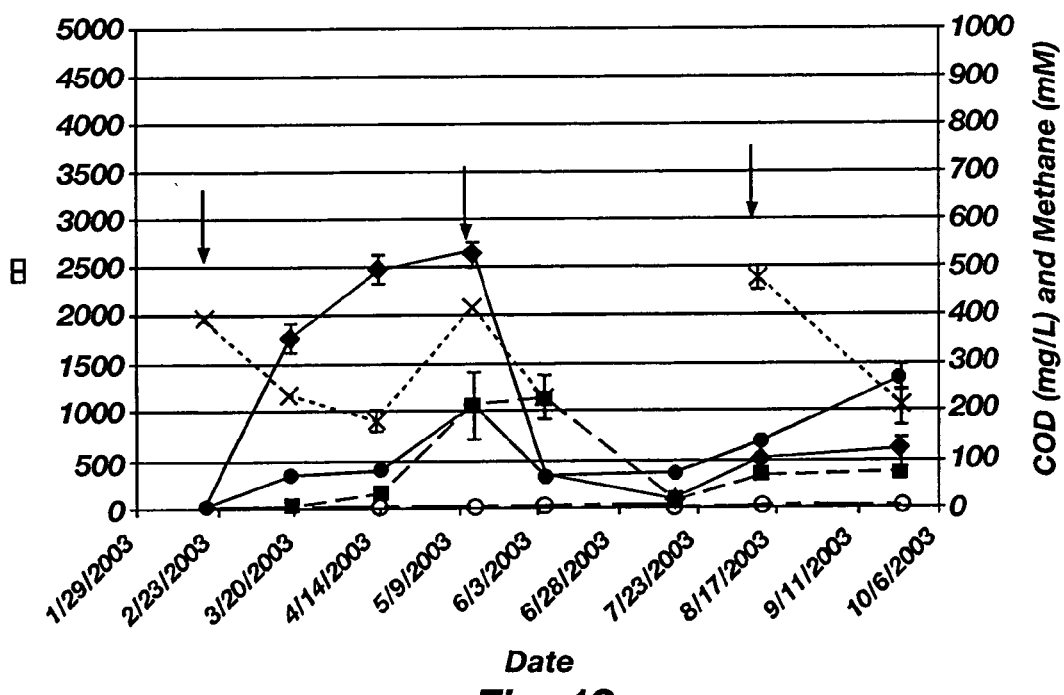

FIG. 12 shows a whey powder plot of fate of amended electron donor: (●) acetate, (■) propionate, (○) butyrate, (x) lactate, (X) COD, (●) methane; arrows show addition of electron donor.

DETAILED DESCRIPTION

Before the present methods for accelerating or enhancing in situ bioremediation of halogenated solvents in ground water are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "an electron donor" includes reference to a mixture of two or more of such electron donors, reference to "a solvent" includes reference to one or more of such solvents, and reference to "a microbe" includes reference to a mixture of two or more of such microbes.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, "PCE," "perchloroethylene," "tetrachloroethylene," and "tetrachloroethene" refer to $Cl_2C=CCl_2$.

As used herein, "TCE," "trichloroethylene," and "trichloroethene" refer to $Cl_2C=CH-Cl$.

As used herein, "DCE," "dichloroethylene," and "dichloroethene" refer to $Cl-HC=CH-Cl$.

As used herein, "VC" and "vinyl chloride" refer to $H_2C=CH-Cl$.

As used herein, "ethylene" and "ethene" refer to $H_2C=CH_2$.

As used herein, "chloroethenes" means PCE, TCE, DCE, VC, and mixtures thereof.

As used herein, "biotransformation" means a biological reduction in the number of halogen, e.g., chlorine, atoms covalently bound to an organic compound. For example, PCE can be biotransformed to TCE, which can be biotransformed to DCE, which can be biotransformed to vinyl chloride, which can be biotransformed to ethylene. If the rate of biotransformation is increased by adding an electron donor to the ground water, then the biotransformation is enhanced.

As used herein, "microbe" means a microscopic organism, such as bacteria, protozoa, and some fungi and algae. Bacteria are illustrative microbes according to the present invention. Biotransformation is enhanced, at least in part, by stimulating indigenous, naturally occurring microbes in the ground water. If indigenous, naturally occurring microbes are not present or are not sufficiently effective, then an appropriate microbe can be added to the ground water, as well as the electron donor of the present invention. The microbe can be added before, with, or after adding the electron donor to the ground water. Typically, the microbe is an anaerobic or facultatively anaerobic bacterium. Bacteria known to work within the current processes include *Dehalococcoides ethenogenes* strain 195 (X. Maymo-Gatell et al., Isolation of a Bacterium that Reductively Dechlorinates Tetrachloroethene to Ethene, 276 Science 1568–1571 (1997)), the Pinellas culture (M. R. Harkness et al., Use of Bioaugmentation To Stimulate Complete Reductive Dechlorination of Trichloroethene in Dover Soil Columns, 33 Environmental Sci. Technol. 1100–1109 (1999); D. E. Ellis et al., Bioaugmentation for Accelerated In Situ Anaerobic Bioremediation, 34 Environmental Sci. Technol. 2254–2260 (2000)), and the like, and mixtures thereof. Other species, however, are known to function, and the present invention is not limited by the examples provided herein.

As used herein, "surfactant" means a substance that when dissolved in water or an aqueous solution reduces its surface tension or the interfacial tension between it and another liquid. Surfactants are characterized by a structural balance between one or more hydrophilic and hydrophobic groups. This amphiphilic nature causes them to be preferentially adsorbed at air-water, oil-water, and solid-water interfaces, forming oriented monolayers wherein the hydrophilic groups are in the aqueous phase and the hydrocarbon chains are pointed toward the air, in contact with the solid surfaces, or immersed in the oil phase. Surfactants are characterized by a critical micelle concentration (cmc), a concentration at which surfactant molecules begin to aggregate into micelles and above which more micelles are formed. Surfactants enhance solubility of nonpolar compounds in aqueous solutions by providing a microenvironment, i.e., the interior of micelles, where the nonpolar compounds can accumulate. In certain illustrative embodiments of the present invention, the electron donor is a surfactant.

As used herein, a "co-solvent" is a solvent present in a minor amount as compared to a solvent with which it is mixed. Co-solvents are like surfactants in that they decrease interfacial tension between two liquid phases, but they generally do not form micelles. Thus, co-solvents enhance solubility, but not to the extent of surfactants. In the context of in situ bioremediation, the rate of enhanced solubilization mediated by a co-solvent or co-solvents is less likely to overwhelm the rate of biotransformation. Thus, in certain illustrative embodiments of the invention, the electron donor is a co-solvent.

Chlorinated solvents represent two of the three most common ground water contaminants at hazardous waste sites in the United States, and with their degradation products they account for eight of the top 20. Unfortunately, chlorinated solvents are relatively recalcitrant compounds with low, but toxologically significant, solubilities in water. Historically, the conventional technology for ground water treatment has been pump-and-treat methodology. While the pump-and-treat approach can be useful for achieving hydraulic containment of a ground water contaminated with chlorinated solvents, it has very rarely been successful for restoration, largely because of the heterogeneity of the subsurface (i.e., preferential flow paths) and the presence of nonaqueous phase liquids. This has led to significant research in the last 10 years on in situ technologies for restoration of ground water contaminated with chlorinated solvents.

Residual chlorinated solvent source areas (where nonaqueous contaminants are present) in the subsurface are especially problematic because the combination of low contaminant solubilities and the lack of mixing in typical ground water flow makes them very long-lived (decades to centuries). As discussed above, the common perception that bioremediation cannot effect improvements to the slow mass transfer from the nonaqueous to the aqueous phase has limited its applications to aqueous-phase contaminated ground water plumes. Also mentioned above, the technology categories used for these areas other than pump-and-treat include thermal technologies such as stream-stripping, in situ chemical oxidation, surfactant flushing, or co-solvent flushing. While these approaches generally result in some rapid mass removal of contaminants and have worked to varying degrees, they all share a common disadvantage: they have a high capital cost in the early stages of remediation. In addition, all except chemical oxidation require extraction of contaminants from the ground with subsequent treatment. This creates new exposure pathways and increases costs. Finally, these technologies rarely restore ground water to contaminant concentrations below regulatory limits, so follow-on activities are generally required.

P. V. Roberts et al., Field Study of Organic Water Quality Changes during Ground Water Recharge in the Palo Alto Baylands, 16 Water Resources Research 1025–1035 (1982), reported one of the first field observations suggesting bioremediation of chloroethenes (PCE, TCE, DCE, and VC). E. J. Bouwer & P. L. McCarty, Transformation of 1- and 2-Carbon Halogenated Aliphatic Organic Compounds under Methanogenic Conditions, 45 Applied Environ. Microbiol. 1286–1294 (1983), confirmed biodegradation of PCE and TCE in the laboratory shortly thereafter. F. Parsons et al., Transformations of Tetrachloroethylene and Trichloroethylene in Microcosms and Groundwater, 76 J. Am. Water Works Ass'n 56–59 (1984), and T. M. Vogel & P. L. McCarty, Biotransformation of Tetrachloroethylene to Trichloroethylene, Dichloroethylene, Vinyl Chloride, and Carbon Dioxide under Methanogenic Conditions, 49 Applied Environ. Microbiol. 1080–1083 (1985), demonstrated that DCE and VC were generated during biodegradation of PCE under anaerobic conditions. Finally, Freedman and Gossett, supra, reported complete dechlorination of PCE to ethylene as follows: PCE→TCE→DCE→VC→ethylene. In each step of the process the compound was reduced (gaining two electrons) through substitution of a chlorine atom by a hydrogen atom. Hence this degradation pathway is often referred to as reductive dechlorination.

In the reductive dechlorination process, chloroethenes act as electron acceptors. This implies that the process can be limited in the field by the availability of sufficient suitable electron donors. In fact, reductive dechlorination also can be totally or partially inhibited by the presence of competing inorganic electron acceptors, such as oxygen, nitrate, iron, and sulfate. It is now widely accepted that reductive dechlorination occurs to some extent at most field sites where chloroethene contamination exists in the presence of a sufficient supply of electron donors (P. L. McCarty, Biotic and Abiotic Transformations of Chlorinated Solvents in Groundwater, in Symposium on Natural Attenuation of Chlorinated Organics in Ground Water 5–9 (Office of Research and Development, U.S. Environmental Protection Agency, Washington, D.C., EPA/540/R-96/509, 1996); J. M. Gossett & S. H. Zinder, Microbiological Aspects Relevant to Natural Attenuation of Chlorinated Ethenes, in Symposium on Natural Attenuation of Chlorinated Organics in Ground Water 10–13 (Office of Research and Development, U.S. Environmental Protection Agency, Washington, D.C., EPA/540/R-96/509, 1996); T. H. Wiedemeier et al., Technical Protocol for Evaluating Natural Attenuation of Chlorinated Solvents in Groundwater, Draft—Revision 1 (Air Force Center for Environmental Excellence, Technology Transfer Division, Brooks Air Force Base, San Antonio, Tex., 1997).

Many oxidizable organic compounds potentially could make suitable electron donors. For a potential electron donor to be useful as an amendment for enhanced in situ bioremediation, however, it must be safe to use, facilitate the desired reaction, and be relatively inexpensive. Lactate is a potential electron donor having these properties. It is innocuous enough for use in the food and medical industries. It has been demonstrated to facilitate reductive dechlorination of chlorinated solvents in several laboratory studies (e.g., W. P. DeBruin et al., Complete Biological Reductive Transformation of Tetrachloroethylene to Ethane, 58 Applied Environ. Microbiol. 1996–2000 (1992); S. A. Gibson & G. W. Sewell, Stimulation of Reductive Dechlorination of Tetrachloroethene in Anaerobic Aquifer Microcosms by Addition of Short-Chain Organic Acids or Alcohols 1392–1393 (1992), D. E. Fennel et al., Comparison of Butyric Acid, Ethanol, Lactic Acid, and Propionic Acid as Hydrogen Donors for Reductive Dechlorination of Tetrachloroethene, 31 Environ. Sci. Technol. 918–926 (1997). The cost-effectiveness of lactate has not been thoroughly evaluated, but preliminary testing suggests that it will be at least as cost-effective as other in situ remediation technologies.

While the use of lactate as an electron donor to facilitate reductive dechlorination is well-established, it has only been applied for remediation of aqueous-phase contaminants because of the perception that bioremediation does not significantly enhance mass transfer of contaminants from the nonaqueous phase. It is shown herein, however, that the addition of high concentrations of a lactate solution not only facilitates reductive dechlorination of aqueous chloroethenes, but also significantly enhances mass transfer of nonaqueous contaminants, making them highly bioavailable. As used herein, "high concentrations" means high relative to the stoichiometric requirement for electron donor to degrade TCE to ethene. Thus, "high concentrations" means about 3–5 orders of magnitude greater than such stoichiometric requirements.

Facilitated transport and enhanced bioavailability of non-aqueous chlorinated solvents through addition of high concentrations of an appropriate electron donor, according to the present invention, take advantage of the natural processes that have made natural attenuation so popular, while also significantly reducing source longevity by enhancing mass transfer to the aqueous phase. The capital costs of the approach are minimal, because only a simple, potentially portable, injection system and monitoring wells are required. Initial mass removal may be slower than some of the other technologies, but it is sustainable for a relatively low cost and requires no extraction of contaminated ground water except for routine monitoring.

High concentrations of lactate, for example, not only provide an electron donor to expedite reductive dechlorination, but also facilitate mass transfer of the nonaqueous chlorinated solvents into the aqueous phase in a manner that makes them highly bioavailable. The lactate appears to act as a surfactant or co-solvent that brings nonaqueous chlorinated solvents into solution. The intimate contact of the chlorinated solvents (electron acceptors) in solution with the lactate (electron donor) enhances bioavailability and leads to rapid biodegradation. The depletion of the residual contamination source is potentially greatly accelerated due to the surfactant or co-solvent effect. The use of lactate to facilitate transport of chlorinated solvents into the aqueous phase and dramatically increase their bioavailability opens up a wide range of applications for enhanced in situ bioremediation of chlorinated solvents present as nonaqueous phase liquids at residual saturation in ground water. The use of a relatively inexpensive compound that accomplishes the same thing as mild surfactants or co-solvents, but does not require extraction and above-ground treatment, combines the advantages of mass removal with those of enhanced bioremediation.

All of the advantages of bioremediation, such as low capital cost, in situ contaminant destruction, unobtrusive appearance, public acceptance, low maintenance requirements, and the like, can be applied to residual source areas because, using this process, source longevity can potentially be greatly reduced. Many of these benefits are enjoyed by owners of contaminated sites, but reduced risk of further releases of contaminants to the public and the environment is also important.

The most appropriate application of this process is to sites with residual chlorinated solvent source areas in the subsurface, comprising primarily nonaqueous contaminants at residual saturation. These are common at both federal and industrial facilities. When very large, mobile DNAPL pools are present, mass transfer rates may be too slow to effect remediation in a reasonable time frame, and more aggressive, capital-intensive approaches may be warranted.

EXAMPLE 1

Figure 1:
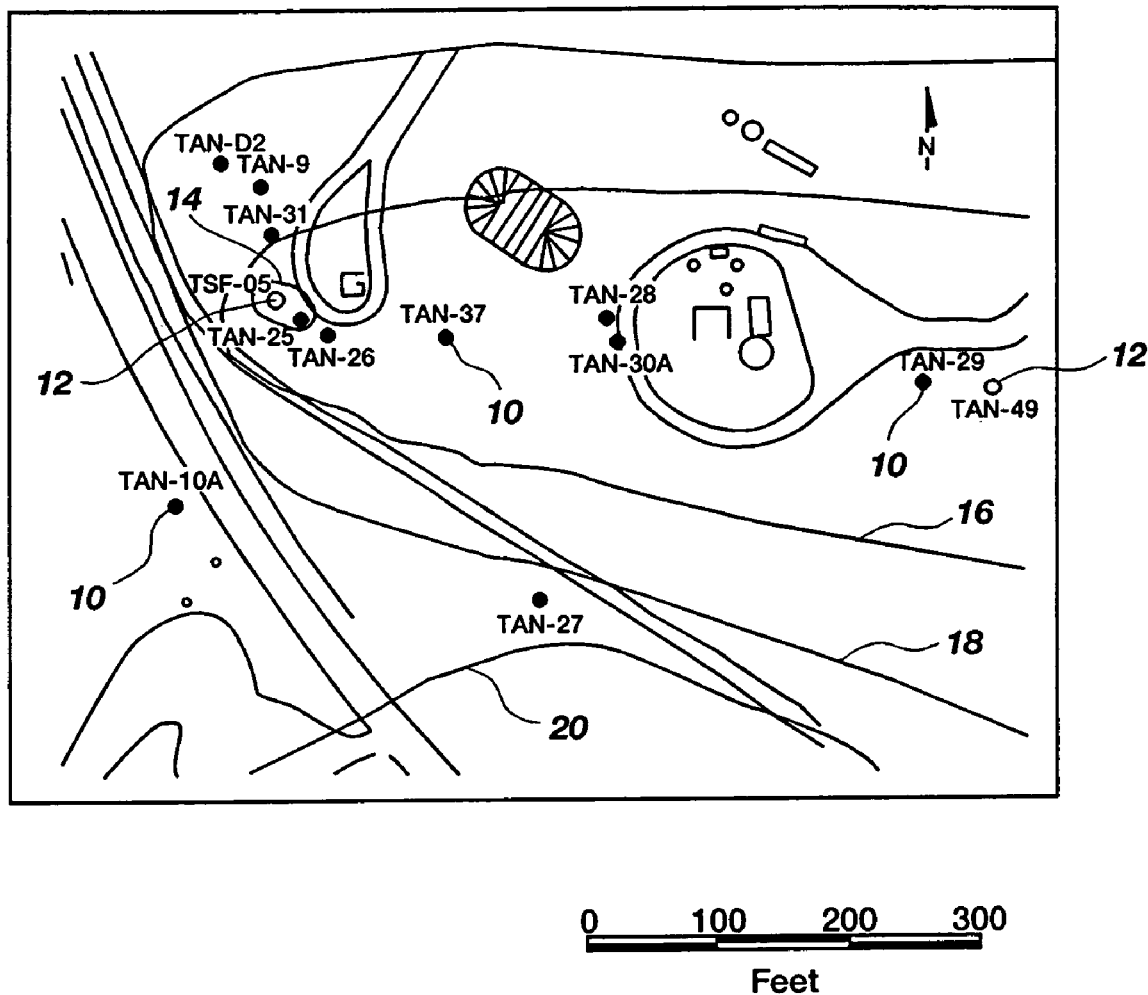
FIG. 1 is a site plan of Test Area North showing the locations of injection wells (○) and monitoring well (●).
Figure 2:
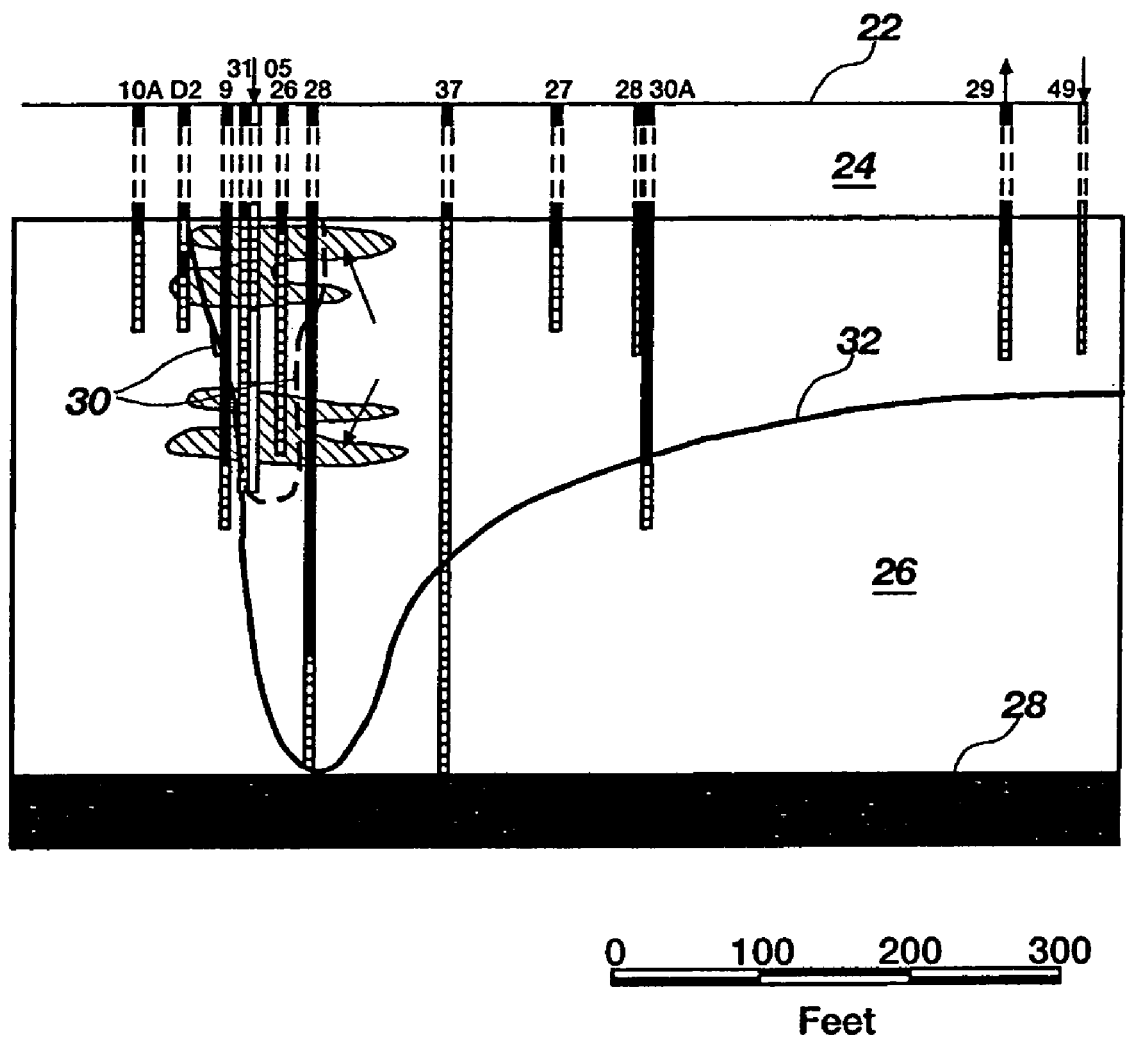
FIG. 2 is a cross section of Test Area North showing the locations and relative depths of injections wells (open bars), monitoring wells (closed bars), and open or screened intervals (hatched bars).

A 1-year field evaluation of enhanced in situ bioremediation was performed at Test Area North ("TAN") of the Idaho National Engineering and Environmental Laboratory. FIG. 1 shows a site plan of TAN, wherein solid symbols represent monitoring wells (10) and open symbols represent injection wells (12). The locations of a 5,000 µg/L TCE isopleth (14); 1,000 µg/L TCE isopleth (16); 100 µg/L TCE isopleth (18); and 5 µg/L TCE isopleth (20) are shown by solid lines. FIG. 2 illustrates a cross section of this site, showing the surface of the ground (22), an approximately 63-m (210-feet) fractured basalt unsaturation zone (24) (not drawn to scale), an approximately 60-m (200-feet) fractured basalt aquifer (26), and an impermeable clay interbed (28). The approximate location of the TCE secondary source (30) and the 1,000 µg/L TCE isopleth (32) are also indicated. The test was performed to determine whether this technology has the potential to enhance or replace the default pump-and-treat remedy selected for the contaminant source area in the site's Record of Decision. The residual source of chloroethenes (30), primarily TCE with some PCE and DCE, is present in the fractured basalt aquifer at the site, about 60 to 120 m below land surface. The residual source area (30) is approximately 60 m in diameter, and the TCE plume emanating from the this source is approximately 3 km long. Based on results of published studies and site-specific laboratory studies (K. S. Sorenson, Design of a Field-Scale Enhanced In Situ Bioremediation Evaluation for Trichloroethene in Ground Water at the Idaho National Engineering and Environmental Laboratory, ASAE, St. Joseph, Mich., Paper No. PNW98–113 (1998)), sodium lactate was chosen as the electron donor and was injected in Well TSF-05 in concentrations ranging from 3% to 60% by weight (Table 2).

The initial electron donor addition strategy involved continuous injection of potable water at 37.85 liters/minute (10 gpm) into Well TSF-05. The electron donor was to be pulsed into this line biweekly. The potable water injection began on Nov. 16, 1998, at the beginning of the startup sampling period. Potable water injection was discontinued on Dec. 11, 1998, due to a significant depression of chlorinated ethene concentrations near the injection well. It was determined that the continuous injection of clean water at 37.85 liters/minute (10 gpm) overwhelmed the flux of contaminants from the secondary source. This condition was considered undesirable for evaluation of an in situ technology, so the electron donor addition strategy was modified such that potable water was only injected for 1 hour following injection of the electron donor solution to flush the solution into the formation surrounding the injection well. This was intended to prevent significant quantities of electron donor from collecting in the injection well and to help prevent biofouling.

The raw electron donor solution used was food grade sodium lactate. Table 2 presents the injection date, the sodium lactate concentration in percent by weight, the injection rate in units of gallons per minute, the total volume of electron donor injected in gallons, and the volume in gallons of potable water injected at 75.7 liters/minute (20 gpm) to flush the solution into the formation. Lactate injections began on Jan. 7, 1999, and were continued until Sep. 8, 1999. Four injection solution concentrations were used, each being more dilute than the previous solution. The dilutions were made in an effort to keep the lactate in the upper part of the aquifer, reducing density effects that cause the electron donor solution to sink to the base of the aquifer. Because the total mass of lactate was kept constant, and the injection flow rate was not dramatically increased, the duration of injection increased from 30 minutes to 4 hours.

TABLE 2

| Date | Sodium Lactate Concentration (%) | Injection Flow Rate (gpm) | Total Volume Injected (gal) | Potable Water Flush Volume (gal) |
| --- | --- | --- | --- | --- |
| Jan. 7, 1999 | 60 | 10 | 300 | 1,200 |
| Jan. 12, 1999 | 60 | 10 | 300 | 1,200 |
| Jan. 19, 1999 | 60 | 10 | 300 | 1,200 |

TABLE 2-continued

| Date | Sodium Lactate Concentration (%) | Injection Flow Rate (gpm) | Total Volume Injected (gal) | Potable Water Flush Volume (gal) |
|---|---|---|---|---|
| Feb. 2, 1999 | 30 | 20 | 600 | 1,200 |
| Feb. 9, 1999 | 30 | 20 | 600 | 1,200 |
| Feb. 16, 1999 | 30 | 20 | 600 | 1,200 |
| Feb. 23, 1999 | 30 | 20 | 600 | 1,200 |
| Mar. 2, 1999 | 6 | 25 | 1,500 | 1,200 |
| Mar. 4, 1999 | 6 | 25 | 1,500 | 1,200 |
| Mar. 9, 1999 | 6 | 25 | 1,500 | 1,200 |
| Mar. 11, 1999 | 6 | 25 | 1,500 | 1,200 |
| Mar. 16, 1999 | 6 | 25 | 1,500 | 1,200 |
| Mar. 18, 1999 | 6 | 25 | 1,500 | 1,200 |
| Mar. 23, 1999 | 6 | 25 | 1,500 | 1,200 |
| Mar. 25, 1999 | 6 | 25 | 1,500 | 1,200 |
| Mar. 30, 1999 | 6 | 25 | 1,500 | 1,200 |
| Apr. 1, 1999 | 6 | 25 | 1,500 | 1,200 |
| Apr. 6, 1999 | 6 | 25 | 1,500 | 1,200 |
| Apr. 8, 1999 | 6 | 25 | 1,500 | 1,200 |
| Apr. 13, 1999 | 6 | 25 | 1,500 | 1,200 |
| Apr. 15, 1999 | 6 | 25 | 1,500 | 1,200 |
| Apr. 22, 1999 | 6 | 25 | 3,000 | 1,200 |
| Apr. 28, 1999 | 6 | 25 | 3,000 | 1,200 |
| May 5, 1999 | 6 | 25 | 3,000 | 1,200 |
| May 12, 1999 | 6 | 25 | 3,000 | 1,200 |
| May 19, 1999 | 6 | 25 | 3,000 | 1,200 |
| May 26, 1999 | 6 | 25 | 3,000 | 1,200 |
| Jun. 2, 1999 | 6 | 25 | 3,000 | 1,200 |
| Jun. 9, 1999 | 3 | 25 | 6,000 | 1,200 |
| Jun. 16, 1999 | 3 | 25 | 6,000 | 1,200 |
| Jun. 23, 1999 | 3 | 25 | 6,000 | 1,200 |
| Jun. 30, 1999 | 3 | 25 | 6,000 | 1,200 |
| Jul. 7, 1999 | 3 | 25 | 6,000 | 1,200 |
| Jul. 14, 1999 | 3 | 25 | 6,000 | 1,200 |
| Jul. 21, 1999 | 3 | 25 | 6,000 | 1,200 |
| Jul. 28, 1999 | 3 | 25 | 6,000 | 1,200 |
| Aug. 4, 1999 | 3 | 25 | 6,000 | 1,200 |
| Aug. 11, 1999 | 3 | 25 | 6,000 | 1,200 |
| Aug. 18, 1999 | 3 | 25 | 6,000 | 1,200 |
| Aug. 25, 1999 | 3 | 25 | 6,000 | 1,200 |
| Sep. 1, 1999 | 3 | 25 | 6,000 | 1,200 |
| Sep. 8, 1999 | 3 | 25 | 6,000 | 1,200 |

Eleven monitoring wells (i.e., TAN-D2, TAN-9, TAN-10A, TAN-25, TAN-26, TAN-27, TAN-28, TAN-29, TAN-30A, TAN-31, and TAN-37) were sampled biweekly and analyzed for electron donors, biological activity indicators, competing inorganic electron acceptors and their reduced products, chloroethenes, ethene, pH, temperature, and specific conductivity.

Figure 3A:
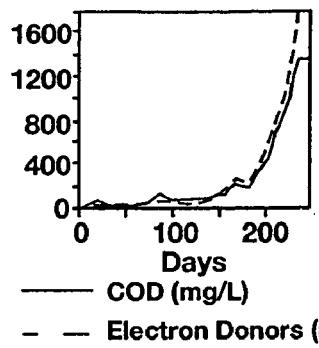
FIGS. 3A–C show the relationship of electron donor concentrations and redox conditions to reductive dechlorination at well TAN-31.

Electron Donor Distribution. Because concentrated lactate solutions are denser than water, their injection into an aquifer can cause density-driven flow downward in the aquifer. At TAN, some density-driven flow was desirable during lactate addition because the zone to be treated was approximately 60 m thick but the injection well (TSF-05) was completed only in the upper 30 m. It was apparent after the first month of injections, however, that too much of the lactate solution was moving into the lower half of the zone before spreading horizontally in the upper half of the zone. For this reason, the concentration of the lactate was reduced and the injection duration was increased in steps over several months. The importance of the lactate addition strategy can be seen in well TAN-31, a cross-gradient well completed in the upper half of the treatment zone approximately 15 m from the injection well (FIG. 3A). The increasing lactate concentrations after 150 days correspond to the third (and final) step in changing the injection strategy.

Figure 3B:
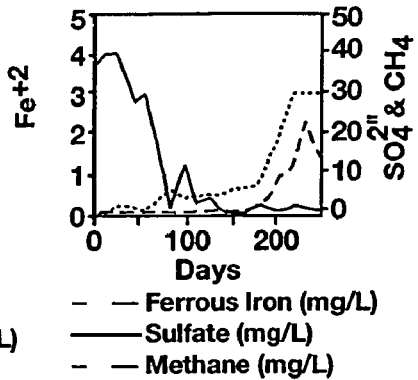
Figure 3C:
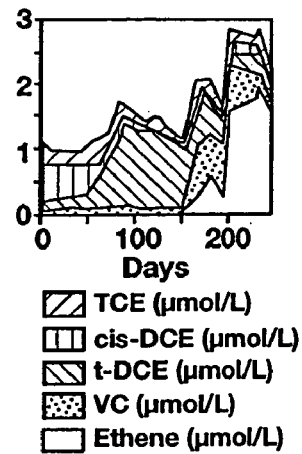

Redox Conditions and Reductive Dechlorination. The effect of lactate addition on redox conditions, and ultimately on reductive dechlorination, is evident in FIGS. 3A–C. Sulfate reduction actually began at the fairly modest lactate concentrations in well TAN-31 during the first 100 days of the test, with minor iron reduction evident from increasing ferrous iron concentrations (FIG. 3B). After sulfate was depleted, TCE transformation to cis-1,2-dichloroethene (cis-DCE) began (FIG. 3C). Reductive dechlorination stopped at cis-DCE until the lactate concentrations increased after 150 days and methanogenesis began. Transformation of cis-DCE to vinyl chloride and ethene coincided almost exactly with the onset of methanogenesis. Beyond about 200 days from the start of the test, ethene was by far the largest constituent at this sampling location.

Enhanced reductive dechlorination of TCE to ethene was observed in all wells receiving significant lactate concentrations.

Based on the results of the field evaluation, enhanced in situ bioremediation was selected to replace pump-and-treat for remediation of the residual contaminant source area at Test Area North. Of particular importance in the decision process was the fact that the process was effective not only for degrading chlorinated solvents in the aqueous phase, but also that the process seemed to have a significant impact on the residual source itself.

Figure 4:
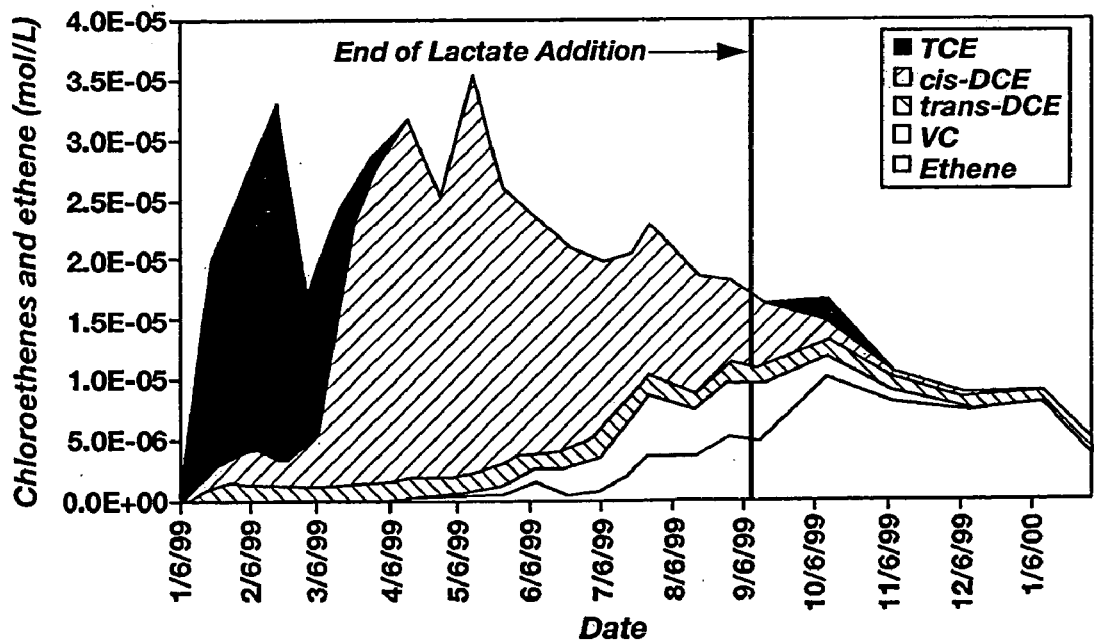
FIG. 4 shows facilitated TCE transport and subsequent biodegradation in well TAN-26.

Enhanced Bioavailability. A surprising observation during the field evaluation was a dramatic increase in TCE concentrations deep in the aquifer soon after sodium lactate addition began (FIG. 4). The TCE increase appeared to occur essentially simultaneously with the arrival of the highly concentrated electron donor solution. In addition, the peak TCE concentration was actually significantly higher than historical measurements for well TAN-26. These observations strongly suggest that the transport of TCE to well TAN-26 was associated with the downward migration of the electron donor. This could occur through two mechanisms. One possible explanation for the large, rapid increase in TCE concentrations is that the lactate solution simply pushed secondary source material along in front of it as it migrated out from well TAN-05, through the secondary source, and down toward well TAN-26. However, tritium was a co-contaminant in the residual source material, and consideration of the tritium data in well TAN-26 appears to rule out this possibility. In fact, tritium concentrations were completely unaffected in spite of large increases in organic contaminant concentrations (TCE and DCE).

A second possible explanation for increased TCE concentrations in well TAN-26 is that the lactate injection led to facilitated transport of the organic contaminants. Three hypotheses that could explain facilitated transport are as follows: (1) that the lactate solution acts as a co-solvent for the organic contaminants, (2) that the lactate acts as a surfactant, and (3) that the lactate solution, because of its high concentration, displaces sorbed chlorinated ethenes, driving them into solution. All of these mechanisms would result in facilitated transport of the chlorinated ethenes in intimate contact with the lactate solution and would make more of the chlorinated ethenes bioavailable. The behavior of the TCE in well TAN-26 after the peak concentration suggests that it was, in fact, extremely bioavailable. The drop in TCE concentration from the peak concentration to undetectable levels occurred with a TCE half-life of less than 20 days (assuming first-order kinetics for illustration). Just as important for the facilitated transport hypothesis, cis-DCE increased to a peak concentration within 20% of the peak TCE concentration (indicating an excellent mass balance), and then remained elevated near that peak concentration. The significance of this point is that the lactate injection was continuing, so if the hypothesis were valid it would be expected to continue bringing the organic contaminants with it as it migrated through the secondary source. After biological activity increased, the TCE was transformed to cis-DCE before reaching well TAN-26, but as shown in FIG. 4, the total ethene level remained approximately constant. After several months the total ethene concentration dropped, but this was expected (and intentional) because the lactate solution concentration had been reduced by a factor of 20 in June. This change reduced the density of the solution significantly, so less lactate, and therefore less total ethenes, was transported to well TAN-26. Thus, the concentration decrease supports the hypothesis of facilitated transport.

The facilitated transport makes available for reductive dechlorination large quantities of the chlorinated ethenes that otherwise would remain associated with the secondary source. As shown by the well TAN-26 data, once made available by the lactate solution, the TCE was, in fact, rapidly degraded. Enhanced bioavailability of chlorinated ethenes in the secondary source would greatly decrease the longevity of the source.

EXAMPLE 2

Based on the field results presented in Example 1, laboratory studies were preformed to confirm that the enhanced bioavailability of TCE observed in the field was due to co-solvent or surfactant behavior resulting from the use of high concentrations of sodium lactate. Two fundamental properties used to screen the co-solvent or surfactant properties of a solution are surface tension and interfacial tension. Surface tension measures the force per unit length along the interface between a liquid and air due to its tension. When a co-solvent or surfactant is present in an aqueous liquid at increasing concentrations, the surface tension of that liquid decreases. Interfacial tension is similar to surface tension except that it measures the force per unit length along the interface between two liquid phases arising from the surface free energy. The higher the interfacial tension between two liquids, the less likely one is to dissolve into the other, and the more difficult it is for one to be transported within the other. Thus, perhaps the most significant property of co-solvents and surfactants in the context of chlorinated solvent remediation is that they decrease the interfacial tension between the aqueous phase (groundwater) and the organic nonaqueous phase so that the solubility (or mobility for order-of-magnitude decreases) of the nonaqueous phase is enhanced.

The laboratory study performed to confirm the co-solvent properties of the high concentration electron donor solution measured the surface tension of electron donor solutions at various concentrations. Next, interfacial tensions between the same electron donor solutions and nonaqueous phase TCE were measured. Two types of electron donor solutions were used. The first was different concentrations of sodium lactate, the electron donor used in Example 1. The second was various mixtures of sodium lactate and ethyl lactate. Ethyl lactate was chosen because it is a lactate-based compound that is used in some industries as a solvent. Thus it was believed ethyl lactate might further enhance the co-solvent behavior observed, while still acting as a suitable electron donor for bioremediation. It is believed that mixtures of sodium lactate and ethyl lactate have never before been used for bioremediation. Surface and interfacial tension measurements were made using the pendant drop method (M. J. Rosen, ed., Structure/Performance Relationships in Surfactants, American Chemical Society, Washington D.C. 329 (1984); R. D. Bagnall & P. A. Arundel, The Profile Area of Pendant Drops, 82 J. Phys. Chem. 898 (1978)) coupled with real-time video imaging (M. D. Herd et al., Interfacial Tensions of Microbial Surfactants Determined by Real-Time Video Imaging of Pendant Drops, Proceedings paper number SPE/DOE 24206 513–519, SPE/DOE Eighth Symposium on Enhanced Oil Recovery, Tulsa, Okla. (1992)).

Figure 5:
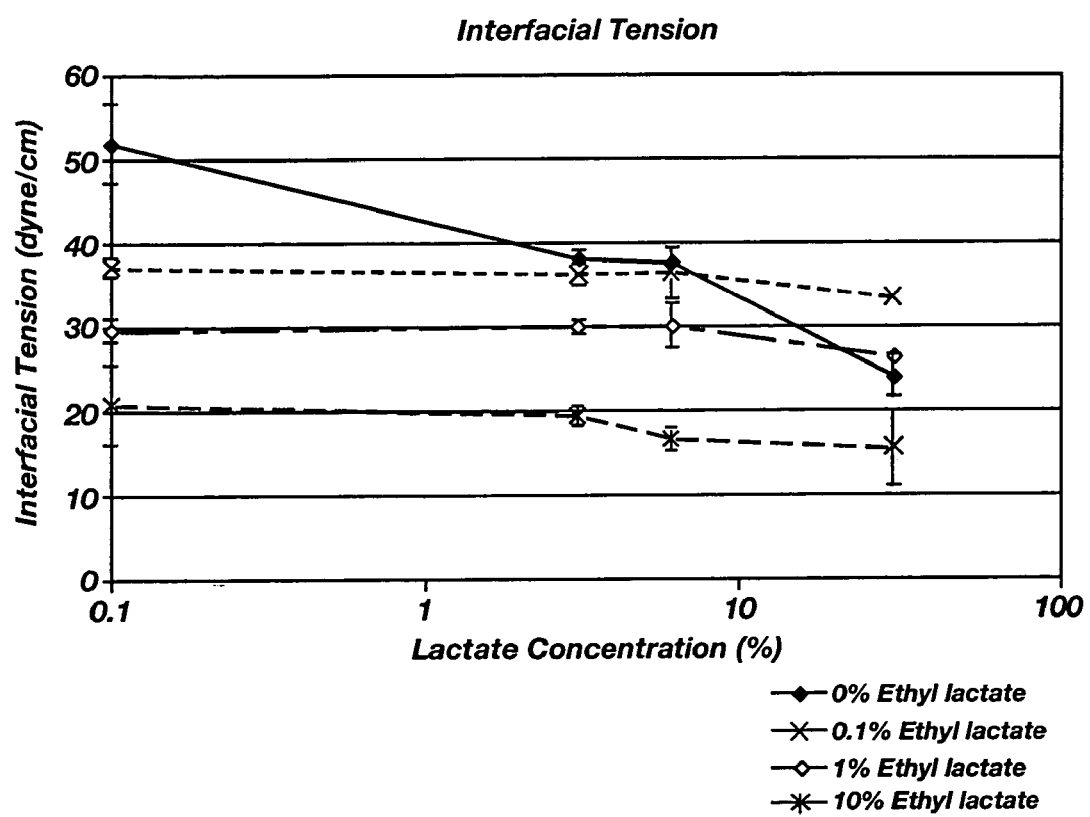
FIG. 5 shows surface tension as a function of lactate concentration for sodium lactate solutions without added ethyl lactate (♦) and with 0.1% ethyl lactate (X), 1% ethyl lactate (◇), and 10% ethyl lactate (*); error bars represent two standard deviations around the mean.

The results of the surface tension experiment are shown in FIG. 5. Surface tension is plotted on the vertical axis, while sodium lactate concentration for each solution is plotted on the horizontal axis. The different lines on the plot are for different concentrations of ethyl lactate ranging from 0 to 10% mixed with the sodium lactate solution. Error bars represent two standard deviations around the mean. Examination of the 0% ethyl lactate line (sodium lactate only) reveals that at sodium lactate concentrations from 0.01 to 7%, almost no change in surface tension occurred. As the concentration was increased to 30 and 60%, however, a dramatic decrease in the surface tension was measured. This result confirms that sodium lactate begins to exhibit co-solvent properties at high concentrations. These concentrations are about 3 orders of magnitude higher than reported in other studies, which explains the surprising results discussed in Example 1.

In an effort to decrease the sodium lactate concentrations required to lower the surface tension of the solution, mixtures with ethyl lactate were evaluated. As seen in FIG. 5, the addition of 1% and 10% ethyl lactate to the different sodium lactate solutions had a pronounced effect on the solution's surface tension. Thus, the addition of ethyl lactate to the sodium lactate electron donor solution enhances its co-solvent properties. The choice of optimum concentration would be a matter of design for a specific remediation. If only slightly enhanced bioavailability of the solvents were desired, the high concentration sodium lactate solution would be appropriate. If a large degree of enhanced bioavailability were desired, the addition of 1 to 10% ethyl lactate would be appropriate.

Figure 6:
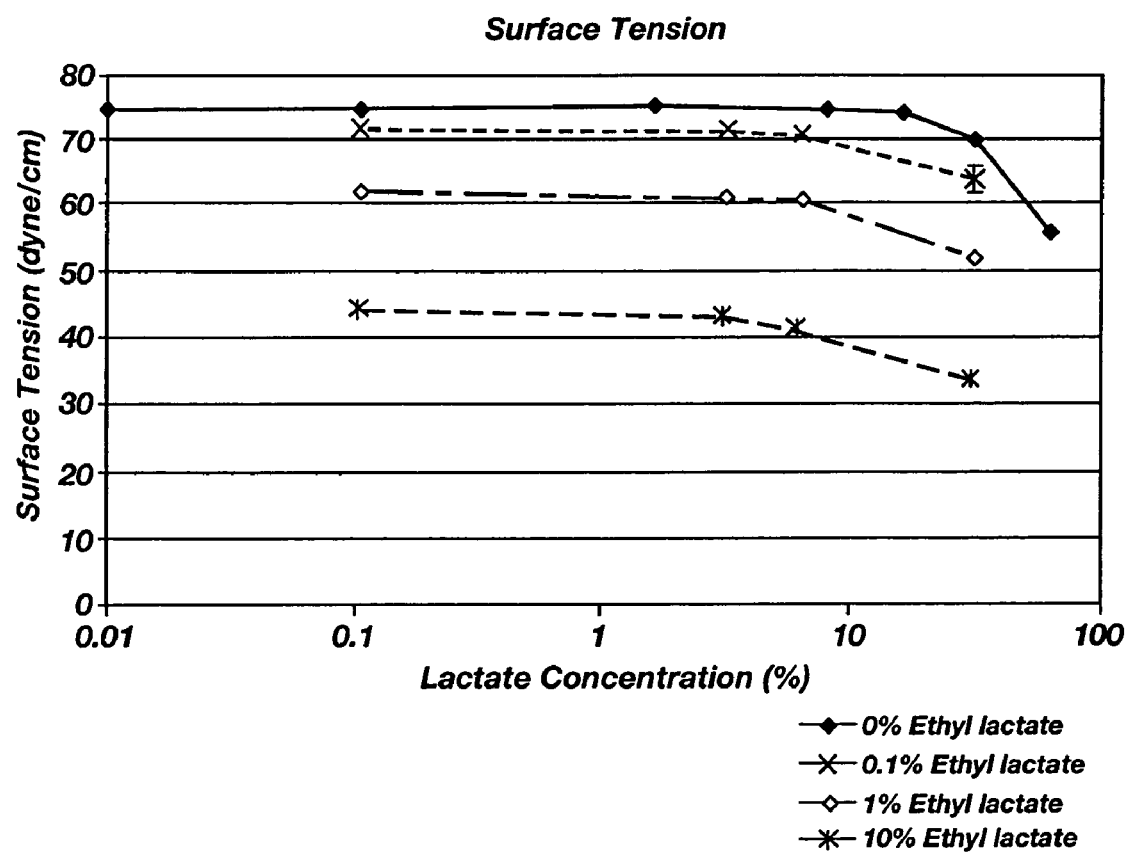
FIG. 6 shows interfacial tension as a function of lactate concentration for sodium lactate solutions without added ethyl lactate (♦) and with 0.1% ethyl lactate (X), 1% ethyl lactate (◇), and 10% ethyl lactate (*); error bars represent two standard deviations around the mean.

The results of the interfacial tension measurements are shown in FIG. 6. As before, error bars represent two standard deviations around the mean. For 0% ethyl lactate (sodium lactate only), the effect of increasing sodium lactate concentration occurs at lower concentrations for interfacial tension than observed in the surface tension measurements. Interfacial tension decreased by about 26% when sodium lactate was increased from 0.1 to 3% (still 2 orders of magnitude above previous studies). When sodium lactate was increased to 30%, the interfacial tension was decreased to 47% of the value at a sodium lactate concentration of 0.1%. Again, the importance of high sodium lactate concentrations for achieving the co-solvent properties is apparent.

As ethyl lactate was added to the sodium lactate solutions, it is clear that the ethyl lactate concentration is the primary factor affecting interfacial tension. FIG. 6 shows that the interfacial tension becomes relatively insensitive to sodium lactate concentration for the ethyl lactate mixtures. From a remediation design standpoint, this simplifies things because co-solvent effects appear to be affected by only one component of the mixture. Interestingly, only the 10% ethyl lactate mixture displayed lower surface tensions than the 30% sodium lactate solution with no ethyl lactate.

EXAMPLE 3

Understanding the movement of an electron donor through a specific aquifer matrix is critical in assessing the potential biological area of influence that would result from injection of an electron donor into the aquifer. Consideration of inhibition of flow due to physical and geochemical interactions between the electron donor and the matrix is important in assessing the potential use of electron donors. At TAN, the interaction of the electron donor with the TCE residual source (any nonaqueous form of chlorinated solvents) must also be considered. Enhanced solubility of the residual source has significant impacts on remediation time frame and costs. Potential factors influencing electron donor migration include interaction between the aqueous and nonaqueous phases in the aquifer, suspended solids content, the ability to emulsify or dissolve the electron donor, and the physical properties of the electron donor solution, including solubility, viscosity, and sorption to the solid matrix. Most of the general properties could be determined during the initial screening phase of the electron donor using published data. The TAN aquifer is comprised of fractured basalt intercalated with sedimentary beds. The sedimentary beds are relatively impermeable and, as a result, the majority of groundwater flow occurs through the basalt fractures. Therefore, when assessing an electron donor, four parameters were used to evaluate the potential flow limitations and interactions with TCE DNAPL of the electron donor through basalt, as follows: (1) transportability of the electron donor through a basalt matrix, (2) retention of the chemical oxygen demand (COD) during transport through a basalt matrix, (3) retention of interfacial tension reduction through a basalt matrix, and (4) effect of the electron donor on the solubility of TCE DNAPL in the basalt matrix.

Basalt columns were prepared by crushing basalt and collecting particles that were retained by a 1.6-mm mesh size sieve but passed through a 3.2-mm mesh size sieve. The sized basalt particles were washed with water to remove fines, sterilized by autoclaving, slurried with tap water, and packed into 28.5×5.03-cm inside diameter glass columns in 3-cm lifts. The columns were then capped with plexiglass end plates tapped for nylon plumbing fittings. A fabric mesh screen and a rubber gasket were placed between the end plates and the crushed basalt to seal the column during tightening of a metal frame threaded through the end plates. All column components were either autoclaved or surface-disinfected with dilute sodium hypochlorite solution. The columns were generally used within one week of packing.

The columns were clamped to a metal support lattice and operated in the up-flow mode. Polyethylene tubing and nylon and stainless steel fittings were used to connect the flow units to a pressure gauge, peristaltic pump, electron donor solution reservoir, and waste container. The columns were initially saturated with tap water, air pockets were eliminated, and mass measurements were made to obtain porosities.

The electron donor solutions were prepared such that they mimicked the proposed solution that would be injected in the field setting. For instance, sodium lactate has been injected at TAN in concentrations between 3 and 60%; the concentrations of sodium lactate controls used during this study were between 1 and 15%. The electron donor solutions were pumped into each column using a multi-head peristaltic pump, which allowed the columns to be operated at the same flow velocity and pore volume period (1 hour).

Three four-column experiments were set up for this study. They included one for each of the two electron donor solution concentrations tested, one tap water positive control, and one ionic strength positive control using sodium chloride, when necessary (e.g., when testing sodium lactate). The flow rate used (5 mL/min) was intended to represent a velocity reflective of a realistic injection velocity at TAN (1 ft/day). Initial influent and subsequent effluent COD readings and interfacial tension samples (where applicable) were taken to assess movement of the electron donor solution through the basalt matrix.

TCE Analysis. TCE samples were taken from the effluent of the columns and negative control samples were taken from the influent. These samples were analyzed by injecting the liquid samples (100 µL) directly into an HP5890 Series II gas chromatograph (GC) equipped with an electron capture detector (ECD) and an Rtx-624 column. Samples were injected with an autosampler from 2-mL samples collected with no headspace. The samples collected were analyzed within 72 hours and usually within 24 hours.

COD Analysis. Samples (2.7 mL) were taken of the influent electron donor solution, and periodically of the effluent, and preserved using concentrated sulfuric acid (0.3 mL). Samples were analyzed in accordance with the Hach 10067 method. Sampling frequency was generally 3 times during equilibration of the columns, 4 to 5 times during alternate amendment, and 1 to 3 times after water was re-amended to all of the columns.

Interfacial Tension Analysis. IFT measurements were taken for the effluent of the electron donor solutions and from the influent as a control. Sampling frequency was the same as the COD analysis except that 10-mL samples were taken. The samples were prepared for analysis by amending each with approximately 750 mg/L TCE and equilibrating them at least overnight. Samples were prepared in 25-mL or 50-mL serum vials capped with Teflon-lined rubber septa and were immediately placed on a shaker table set at 150 rpm. Measurement were made using an Intefacial Tensiometer, M. D. Herd et al., Interfacial Tensions of Microbial Surfactants, Determined by Real-Time Video Imaging of Pendant Drops, paper SPE-DOE 24206 presented at the SPE/DOE Eighth Symposium on Enhanced Oil Recovery, Tulsa (22–24 Apr. 1992). Briefly, a drop of less dense liquid was injected upward into a cell containing the more dense liquid using a syringe pump. The interface between the two liquids formed an image that was captured by a video camera, magnified, and displayed on a computer monitor. The interfacial tension was then calculated using the dimensions of the drop and the density difference between the two liquids.

The column studies were performed by setting up the saturated columns, inoculating them with TCE DNAPL, and allowing them to run overnight at a very low flow rate (~0.1 mL/min) in order to allow sorption of the TCE onto the basalt matrix. The columns were loaded with TCE DNAPL (150 µL) by using a glass, airtight syringe with a long needle, placing the needle approximately half-way down the column, and placing drops of TCE DNAPL up the column. Approximately 16 hours later, the flow rate was increased to 5 mL/min and sampling of the columns began. TCE samples were collected every 20 to 30 minutes, and two to three COD and IFT samples were collected during the period when tap water was the amendment. The columns were allowed to run for approximately 4 hours using the tap water so that the effluent TCE concentration could reach equilibrium. After this period, electron donors were amended to each respective column (including a tap water control column), TCE samples were collected every 20 to 30 minutes, and COD and IFT samples were collected every hour. Again, enough time was allowed to pass (approximately 4 hours) so that equilibrium in the effluent TCE concentrations could be achieved in each column. All columns were then switched back to tap water and samples were collected as before in order to determine any rebound effects.

In this example, 1% and 10% whey powder solutions were used as the electron donors. In this connection, 1% whey powder solution was prepared by dissolving 50 g of whey powder in 4,950 ml of water (density=1.01 g/mL), and 10% whey powder solution was prepared by dissolving 500 g of whey powder in 4,500 mL of water (density=1.04 g/mL).

Analysis of relative effluent TCE concentrations was used to determine the effect of the electron donor solution on TCE DNAPL solubility. The equilibrium effluent TCE concentration in each column using tap water was used as the baseline from which the equilibrium effluent TCE concentrations using the alternate amendment solution could be compared. The relative difference in TCE concentration was used as an indicator for enhanced solubility of TCE DNAPL using the alternate amendment as compared with tap water. IFT analysis was also performed to see if enhanced TCE solubility could be correlated with significant drops in IFT between the electron donor solution and tap water.

Analysis of COD was performed to assess the retention of the electron donor solution through the basalt-packed columns. The difference between the influent and effluent COD was calculated during the alternate amendment to determine the relative percentage of the electron donor that moves through the basalt compared to the sodium lactate positive control. Differences between the physical appearance of the influent and effluent electron donor solutions were also noted. These parameters were used to assess the relative donor migration potential (relative to the sodium lactate positive control) of the electron donor through a basalt matrix. Column pressure was also closely monitored throughout the experiment. The column pressure of the electron donor solution was assessed in order to determine if clogging of the column was occurring as a result of amendment with the electron donor solution.

Figure 7:
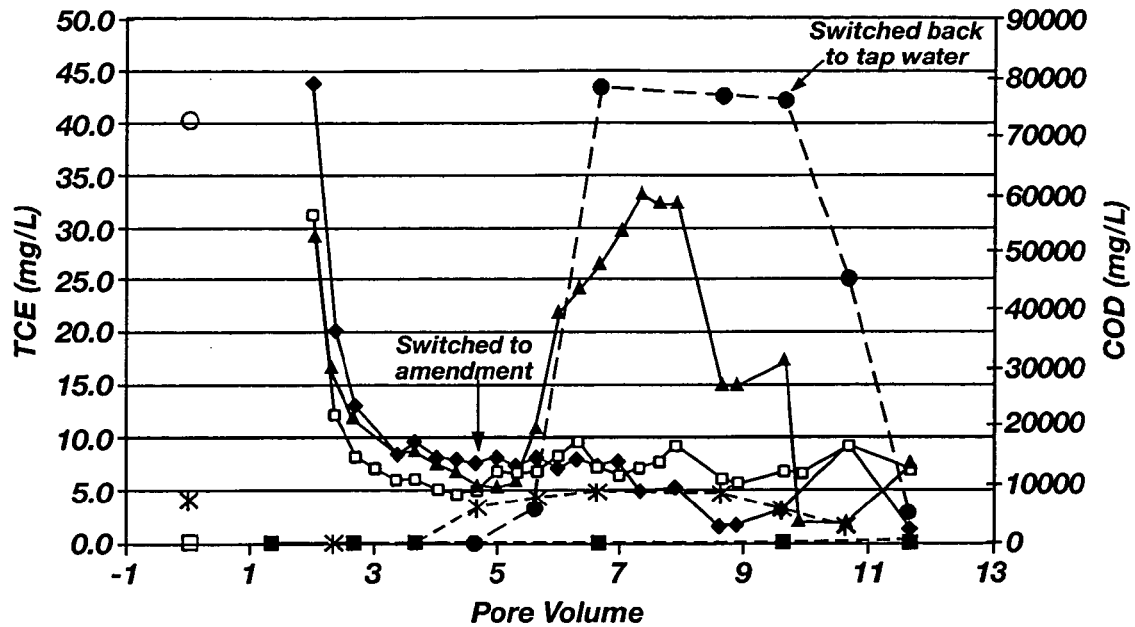
FIG. 7 shows correlation between effluent TCE and chemical oxygen demand (COD) for the whey powder column study of Example 3: (♦) tap water TCE, (□) tap water COD influent, (■) tap water COD, (▫) 1% whey powder TCE, (X) 1% whey powder influent COD, (x) 1% whey powder COD, (▲) 10% whey powder TCE, (○) 10% whey powder influent COD, (●) 10% whey powder COD. Arrows show when addition of whey powder solution began and ceased.
Figure 8:
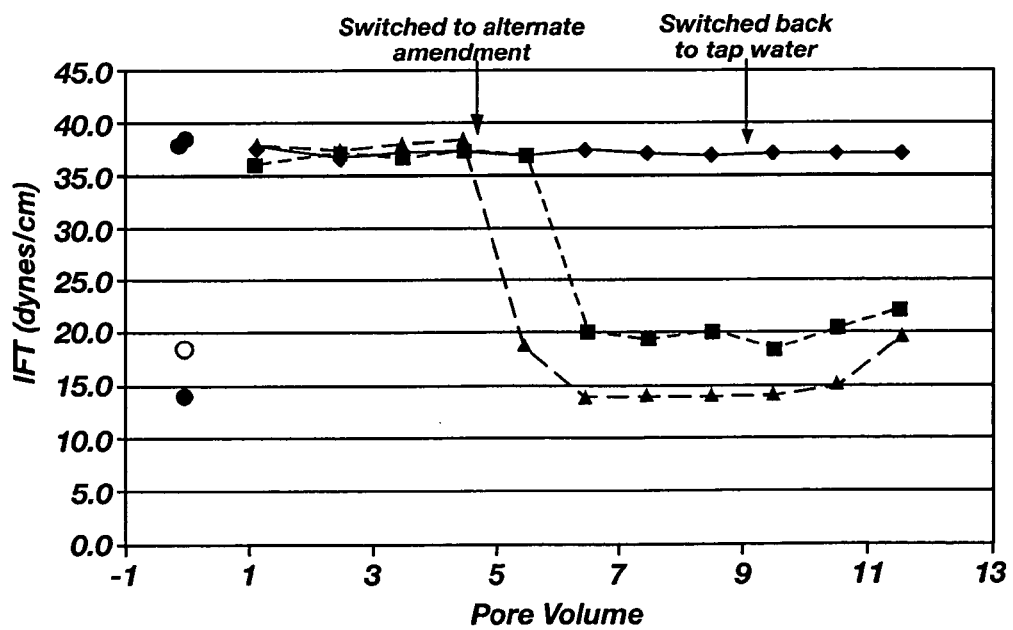
FIG. 8 shows interfacial tension (IFT) measurements between column effluent/influent and TCE DNAPL during the whey powder amendment of Example 3: (♦) tap water, (●) influent whey powder (10%), (■) whey powder (1%), (○) influent whey powder (1%), (▲) whey powder (10%), (●) tap water. Arrows show when addition of whey powder solution began and ceased.

Column experiment results using whey powder were significantly different than those observed using sodium lactate as the column amendment (FIGS. 7 and 8). Initial effluent TCE concentrations were considerably lower than the initial concentrations for sodium lactate. The columns were allowed to equilibrate until effluent TCE concentrations were 9.4 ppm for tap water, 8.6 ppm for 10% whey powder amended, and 6.1 ppm for the 1% whey powder amended columns. The alternate amendments were then made to each respective column. Following the start of amendment, TCE concentrations remained relatively unaffected for approximately 1.7 hours (1.7 pore volumes).

As shown in FIG. 7, effluent TCE concentrations increased approximately 1.7 pore volumes after the 10% whey powder amendment began to peak at concentrations of approximately 34 ppm (relative difference approximately 24 ppm). Elevated effluent TCE concentrations were observed during the period of whey powder amendment. The TCE concentration in the effluent, however, decreased slightly to approximately 15 ppm during the last three sample points of the whey powder amendment. After the amendment was switched back to tap water, the effluent TCE concentrations dropped below 5 ppm, suggesting that significant TCE DNAPL may have been removed during the whey powder amendment. The 1% whey powder amendment showed no significant difference in TCE concentrations in the column effluent as compared with the tap water baseline. TCE concentrations in this column ranged from 5 to 10 ppm throughout the duration of the experiment regardless of the amendment. TCE concentrations in the tap water control also maintained an equilibrium concentration of approximately 8 ppm throughout most of the experiment, although concentrations dropped to less than 5 ppm after 7 pore volumes.

The increase in TCE concentration observed in the column effluent during the 10% whey powder amendment could be correlated to an increase in COD concentration. COD concentrations also substantially increased in the 1% whey powder column effluent during amendment of the whey powder solution, but this could not be correlated to an increase in TCE concentrations. COD concentration in the column effluent in the whey powder columns reached approximately 77,000 ppm during the 10% amendment and approximately 8,000 ppm during the 1% amendment. These concentrations were slightly higher than the 73,000 and 7,300 ppm measured for the influent solutions. These numbers illustrate that COD was not lost in the columns during the column experiment. Pressure changes were also not observed during the whey powder amendment; therefore, transportability of the whey powder solutions through the columns appeared to be satisfactory. COD measurements were zero for the tap water used in the influent and for all effluent column samples collected when tap water was the amendment.

The increased TCE concentrations during the 10% whey powder amendment could also be correlated to IFT reductions (FIG. 8). The reduction in IFT between TCE DNAPL and the column effluent occurred immediately following the start of the whey powder amendment, and IFT remained low until the amendment was terminated. IFT measurements of effluent correlated well with IFT measurements of influent (approximately 14 dynes/cm), suggesting retention of IFT properties during transport through the column. IFT reductions, however, were also observed in the 1% whey powder column, as measurements were approximately 37 dynes/cm during tap water amendment and 20 dynes/cm during whey powder amendment. Therefore, IFT reductions during low concentration whey powder amendment did not correlate with enhanced solubility of TCE DNAPL in the column. All IFT measurements made of the tap water column influent and effluent were between 37 and 38 dynes/cm.

Based on visual observation, monitoring of pressure and differences in COD measurements between solution amendments and column effluents, whey powder was transported efficiently through the basalt columns. The whey powder amendment resulted in direct enhancement of TCE dissolution. Whey powder resulted in an average increase of approximately 22 ppm during amendment as compared to tap water. This enhanced dissolution of TCE was correlated with an interfacial tension measurement reduction and an increase in COD, as measured in the column effluent.

EXAMPLE 4

In this example, the procedure of Example 3 was followed except that a mixture of dipropionate and ethyl lactate was substituted for whey powder solution. The mixtures were either 10% ethyl lactate+7% dipropionate and 1% ethyl lactate+0.7% dipropionate.

Figure 9:
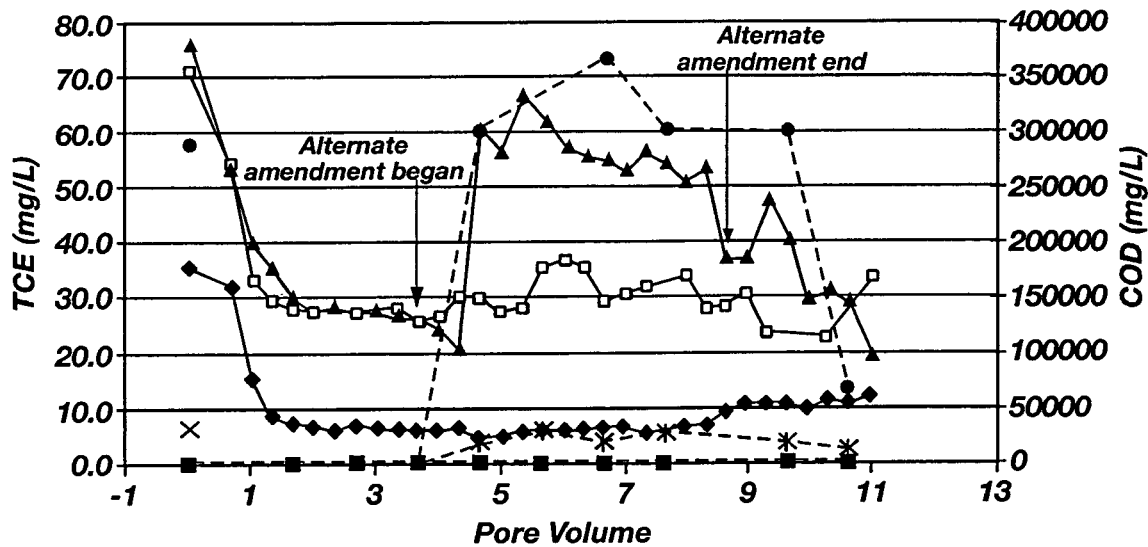
FIG. 9 shows correlation between effluent TCE and chemical oxygen demand (COD) for the dipropionate/ethyl lactate amendment of Example 4: (♦) tap water TCE, (■) tap water influent, (●) 10% ethyl lactate/7% dipropionate COD, (▫) 1% ethyl lactate/0.7% dipropionate TCE, (x) 1% ethyl lactate/0.7% dipropionate COD, (X) 1% ethyl lactate/

Results of data collected during column experiments conducted to assess a mixture of ethyl lactate/dipropionate are shown in FIGS. 9 and 10. The effluent TCE concentrations observed during the tap water equilibration period were between 27 and 28 ppm (10%/7% and 1%/0.7% ethyl lactate/dipropionate) and 7 ppm (tap water) for the columns used in this study. Overall, the effect of increasing concentrations of the ethyl lactate/dipropionate mixture resulted in increased solubility of TCE DNAPL, an effect similar to what was observed during the whey powder column experiments (Example 3).

Following amendment with 1%/0.7% ethyl lactate/dipropionate, the column effluent TCE concentrations increased from approximately 27 ppm during tap water equilibration to a peak concentration of 67 ppm during the amendment. Following amendment termination, the effluent TCE concentration in the column steadily dropped to a concentration of approximately 20 ppm and 2.3 pore volumes after the influent was switched back to tap water. A similar trend was observed with the lower concentration (1%/0.7% ethyl lactate/dipropionate) amendment column, although the magnitude of the change was much less. The effluent TCE concentrations increased from approximately 27 ppm to a peak concentration of 36 ppm as the amendment was switched from tap water to the low concentration ethyl lactate/dipropionate mixture. Once the low concentration amendment was terminated, the TCE effluent concentration dropped to approximately 23 ppm during the tap water flush. The tap water control column TCE effluent concentrations initially reached equilibrium at approximately 7 ppm and gradually increased to approximately 10 ppm toward the end of the experiment.

The increased TCE effluent concentrations observed during amendment of the high concentration (10%/7%) ethyl lactate/dipropionate mixture corresponded with decreased IFT measurements in the column effluent. The IFT dropped to approximately 12 dynes/cm during the high concentration amendment, which is similar to the IFT observed for the influent ethyl lactate/dipropionate solution. Therefore, the IFT properties were conserved during transport of the ethyl lactate/dipropionate solution through the basalt matrix. This is in contrast with the dipropionate column results, where IFT reduction did not correspond with increases in effluent TCE concentrations. Therefore, the ionic strength effect observed with the dipropionate alone was not observed for the ethyl lactate/dipropionate mixture.

A slight decrease in IFT was also observed during amendment of the low concentration (1%/0.7%) ethyl lactate/dipropionate. This decrease in IFT also corresponded with increased effluent TCE concentrations in the basalt column. The IFT measurements in the column effluent during the low concentration amendment were comparable to the influent IFT measurements (both were around 30 dynes/cm). The tap water control column had IFT values that were stable at approximately 39 dynes/cm. In general, IFT reductions resulting from ethyl lactate/dipropionate amendments correlated to enhanced TCE dissolution, as indicated by enhanced concentrations of TCE in the basalt column effluent.

Based on visual observation, monitoring of pressure, and differences in COD measurements between solution amendments and column effluents, the mixtures of ethyl lactate and dipropionate were transported efficiently through the basalt columns. The mixture of ethyl lactate and dipropionate resulted in direct enhancement of TCE dissolution. The mixture of ethyl lactate and dipropionate resulted in an average increase of approximately 32 ppm as compared to tap water. The enhanced dissolution of TCE was correlated to an IFT measurement reduction and an increase in COD, as measured in the column effluent. Interestingly, ethyl lactate alone had no observable effect on TCE solubility, while dipropionate by itself inhibited the dissolution of TCE. Therefore, the combination of ethyl lactate and dipropionate was not expected to enhance the dissolution of TCE DNAPL.

EXAMPLE 5

Dechlorination studies were carried out to determine if whey powder solutions facilitate complete degradation of target contaminants at reasonable rates. Microcosms were constructed in triplicate sets. These microcosms were amended periodically with whey powder and TCE and analyzed monthly for TCE, its reductive degradation products, electron donor (as both COD and volatile fatty acids (VFAs)), redox, and pH.

An existing laboratory, sodium lactate-fed culture, derived from TAN-25 groundwater undergoing complete anaerobic reductive dechlorination (ARD) of TCE to ethene, was used to inoculate the cultures. Fresh TAN groundwater from the source area was also used to ensure that microbial populations that have been lost as a result of laboratory conditions were present for the evaluation. Serum vials (160 mL) were used as microcosms to grow the cultures. Prior to inoculation, the microcosms, along with all other culture-contact supplies, were autoclaved at 121° C. for 20 minutes and cooled to room temperature. Inoculation of the microcosms was done in a glove box containing nitrogen (95%), carbon dioxide (2.5%), and hydrogen (2.5%). Each microcosm was loaded with the inoculum, which comprised cells from the TCE-dechlorinating culture (1 L), cells from TAN-25 groundwater (1 L), and TAN-37 groundwater (2.5 L) as the media.

The culture cells were used to ensure a robust dechlorinating community was present, and cells were collected from TAN-25 groundwater to ensure the laboratory community was representative of the community at TAN. In other words, often the majority of microbial populations initially present in a particular environment are lost when that community is transferred to the laboratory; therefore, recruitment of lost populations may be necessary in order to achieve a more realistic evaluation of potential performance at a particular site. The cell pellets from the dechlorinating culture and TAN-25 groundwater were separated from the supernatant because both contained electron donors, including propionate, acetate, and lactate. TAN-37 groundwater was selected as the medium because it was anaerobic groundwater that contained little or no carbon (40 mg/L as COD with <2.5 ppm acetate and propionate) that might interfere with the evaluation of electron donor utilization. The inoculum mixture was then spiked with TCE (10 ppm), aliquoted (100 mL) into the microcosms, and each respective electron donor was added (~200 ppm for all electron donors except whey powder [~400 ppm]). The microcosms were then sealed with butyl-rubber septa and crimped. The headspace of each microcosm was flushed for 10 minutes with 100% nitrogen, and then an initial positive pressure of 5 psig was induced into each one. Abiotic negative control microcosms were set up in a similar manner to the test microcosms except that the culture was spiked with zinc chloride (0.1% w/v), a known anti-microbial agent. The test microcosms were prepared in triplicate and negative control microcosms were amended with whey powder and Lac-tOil™/propionate. The study included a total of 20 microcosms.

Three months after inoculation, additional electron donor was added to all of the microcosms (200 to 300 mg/L as COD). Six months after inoculation, additional electron donor was added to the whey powder, ethyl lactate/propionate, and sodium lactate microcosms. At this point, approximately 50 mL of TAN-37 groundwater was also amended to all of the biotic microcosms to replace the volume lost because of sampling. This was done by placing all of the biotic microcosms into the anaerobic chamber containing nitrogen (95%), carbon dioxide (2.5%), and hydrogen (2.5%); removing the septum; adding TAN-37 groundwater and electron donor; and replacing septum and spiking each microcosm with a TCE stock solution. TCE was amended to all of the microcosms 4 and 6 months after inoculation.

Throughout these studies, the microcosms were monitored monthly for TCE, cis-DCE, trans-DCE, VC, ethene, ethane, methane, lactate, acetate, propionate, butyrate, pH, and Eh. During sampling, positive pressure was evident in all of the sampled microcosms. Analytical samples (6 mL) were removed using a glass syringe (Hamilton Co., Reno, Nev.) and a 22-gauge sterile needle. An aqueous aliquot (5 mL) was transferred immediately into a serum vial (25 mL), which was sealed prior to sample collection with a Teflon™-lined butyl rubber septum. The vial was shaken vigorously for 30 seconds, inverted, and allowed to equilibrate at room temperature for at least 3 hours. Methane, ethane, and ethene measurements were taken from the headspace of the sealed sample. Chloroethene levels in the headspace of this vial were then measured using the solid phase microextraction (SPME) technique. C. L. Arthur et al, Solid-Phase Microextraction for the Direct Analysis of Water: Theory and Practice, 10 LC•GC 656 –661 (1992). Acetate, butyrate, and propionate were measured using filtered and acidified aliquots (0.5 mL) of the microcosm samples. For lactate analysis, aliquots of the chloroethene samples (4.5 mL) were used. COD and pH were measured using samples (2 mL) from each microcosm. Samples were also removed at the end of the evaluation for DNA extraction (10 mL).

TCE, cis-DCE, trans-DCE, and VC were analyzed using the SPME technique. C. L. Arthur et al., supra. Liquid samples (5 mL) were placed in 25-mL glass serum bottles, sealed with a gray-butyl Teflon® lined septa, and crimped with aluminum caps. The bottles were placed in an inverted position at room temperature for 3 hours to ensure equilibrium. Volatile analytes were transferred to headspace gas within each bottle. A 0.75-µm carboxen polydimethylsiloxane-coated fiber (Supelco, Bellefonte, Pa.) was inserted through each septum and analytes were allowed to sorb onto the filter for 15 minutes. The analytes were then desorbed by inserting the fiber into the injector of a Hewlett Packard (HP) Model 5890 Series II (Hewlett Packard, Palo Alto, Calif.) GC. The GC was equipped with a 30-m, 0.32-mm ID, 1.8-µm df, RTx-624 (Restek, Bellefonte, Pa.) chromatograph column. The injector was fitted with a 1-mm SPME liner and maintained at 250° C. Helium was used as the carrier gas at a flow rate of approximately 2 mL/minute. The column temperature was initially maintained at 60° C. for 6.5 minutes and then increased to 180° C. at a rate of 70° C./minute. Analytes were detected using a flame ionization detector (FID) maintained at 280° C. The GC was calibrated for each analyte using in-house prepared standards. Calibration was verified prior to each analysis using certified control samples. Utilizing this technique, the minimum detection limit for TCE, cis-DCE, and VC is 5 parts per billion (ppb).

Analysis of ethene, ethane, and methane was performed by injecting a headspace sample (100 µL), from the sample (5 mL) prepared for the volatile organic compound (VOC) analysis, into an HP Model 5890 Series II GC equipped with a FID and a 0.53-mm Rt Alumina column (Restek, Bellefonte, Pa.). Helium was used as the carrier gas at a flow rate of 6.5 mL/minute. Throughout the assay, the temperature of the column was maintained at 80° C., the injector at 250° C., and the detector at 275° C. The GC was calibrated using certified gas standards and control samples were assayed daily. Using this procedure, the minimum detection limit for ethane, methane, and ethene is 1 part per billion by volume (ppbv).

Acetate, propionate, and butyrate levels were measured by filtering (0.2-mm pore size) samples and adjusting the pH to 2.0 using concentrated phosphoric acid. Typically, 100 µL of acid were added per 0.5 mL filtrate, and 1.0 µL of the acidified solution was injected directly into an HP Model 5890 Series II GC. The GC was equipped with an FID and a 30-m, 0.53-mm, 0.5-µm df Nukol column (Supelco, Inc., Bellefonte, Pa.). Helium, which was used as the carrier gas, was delivered at a flow rate of 8.2 mL/minute. The column temperature was maintained at 125° C. and the injector and detector temperatures at 225 and 250° C., respectively. The GC was calibrated as above, and the minimum detection limit for acetate, propionate, or butyrate was 0.5 mg/L.

Lactate concentration was determined in filtered culture samples using a Dionex 4500i (Dionex, Sunnyvale, Calif.) ion chromatograph and a conductivity detector. The analytical column was an IonPac ICE-AS6 (Dionex, Sunnyvale, Calif.). A 0.4-mM nitric acid solution was used as the eluent (at a flow rate of 1.5 mL/minute) and 5.0-mM tetrabutylammonium hydroxide was used as the anion suppression regenerant. Using this method, the minimum detection limit for lactate was 2 mg/L.

The total electron donor in each microcosm was measured as COD. Samples were analyzed in accordance with Hach 10067 method or equivalent.

The pH was determined using an Orion Laboratory pH meter equipped with a pH probe (Orion Inc.). Eh was qualitatively assessed for the reactors by adding resazurin (1 mg/L) as a calorimetric indicator. If the solution was clear, then the redox condition within the reactor was methanogenic. All determinations were made at room temperature.

The molar balance of TCE and its reductive products was determined by converting all analytes to gram-mole and calculating the relative conversion ratios and efficiencies. Molar area plots were then created to provide a visual representation of TCE dechlorination efficiency. The dechlorination rates and efficiencies of the electron donor cultures were then compared to the sodium lactate culture dechlorination efficiency. If complete dechlorination of TCE to ethene was observed using the electron donor, and the rates are comparable to sodium lactate, then further analysis of the electron donor for field application was warranted.

Conditions within the microcosm sets were nearly the same, with pH maintained within a range of 7.5 and 8.5 in all microcosms and maintenance of methanogenic reducing conditions (as indicated by lack of color in the amended resazurin). Significant differences in dechlorination performance, however, were observed between the microcosms amended with the different electron donors. Molar area plots (FIG. 11, for example) were generated to illustrate the production of dechlorination daughter products in the test microcosms over the study period. Dechlorination daughter product cis-DCE was observed in the ethyl lactate/propionate, whey powder, dipropionate, and sodium lactate microcosms 1 month after inoculation. Whey powder had the most accumulated cis-DCE with an average concentration of 162 ppb, as compared with ethyl lactate/propionate (69 ppb), dipropionate (45 ppb), and sodium lactate (75 ppb). Two months after inoculation, the whey powder microcosms had dechlorinated nearly half of the amended (~5 ppm) TCE to ethene. Ethene production was also observed for the ethyl lactate/propionate and sodium lactate microcosms, although this only accounted for 10% of amended TCE. Three months after inoculation, all of the TCE was gone from the whey powder, ethyl lactate/propionate, and sodium lactate microcosms and only ethene was detected. The dipropionate microcosms had depleted over 40% of the TCE, with 20% apparent as ethene. Therefore, since most of the TCE was likely depleted in these microcosms by the next sampling event (1 month later), TCE was amended to all of the microcosms. One month after this TCE addition, all of the TCE was gone in the sodium lactate and dipropionate microcosms (only ethene was present) and most of it (>87%) was gone in the whey powder and ethyl lactate/propionate microcosms. Significant ethene losses, however, were apparent during this period, as only 40 to 50% of the molar concentration of TCE could be accounted for as ethene.

In all dechlorinating microcosms, the progression of dechlorination went from TCE to cis-DCE to VC to ethene. Ethane was not detected in any of the microcosms, which is consistent with observations of ARD at TAN. During the last three sampling events, trans-DCE was detected in all of the microcosms. This is likely the result of residual trans-DCE in the TAN groundwater used to re-amend the microcosms 6 months after inoculation, which is supported by the fact that it appeared in all of the microcosms at the same time and at approximately the same concentrations. Concentrations of trans-DCE were never greater than 1 µM in all microcosms.

One of the main objectives of the microcosm studies was to compare electron donor utilization between the different microcosm sets. Plots demonstrating oxidation of the electron donors and subsequent production of VFAs were prepared (FIG. 12, for example). Complex electron donors such as whey powder do not have defined chemistries, so COD was used as a measurement of total electron donor. Electron donor was added to the sodium lactate, ethyl-lactate/propionate, and dipropionate microcosms on three occasions: initially, and 3 and 6 months after inoculation. Electron donor was amended to the LactOil™ and LactOil™/propionate microcosms twice: initially and 3 months after inoculation. Overall, COD reduction occurred in all biotic microcosms following electron donor addition. Concomitant with this observation was generation of the VFAs propionate and acetate in all of the microcosms. Therefore, all electron donor amendments were undergoing anaerobic fermentation or homoacetogenesis. In the whey powder negative control, reduction of COD and generation of propionate and acetate were also observed during the first 3-month period. This is likely due to increased tolerance of the culture to the zinc chloride. After adding additional zinc chloride (2%) at 4 months, COD reduction ceased, as did acetate and propionate generation. In the LactOil™/sodium propionate negative control, overall COD reduction was not observed, although acetate production was also observed during the first 3 months until additional zinc chloride was added.

Methane production was also observed in all of the biologically active microcosms. Whey powder generated the most methane with concentrations increasing to over 200 µM in 3 months. In contrast, after 3 months only approximately 50 µM was generated in the sodium lactate and ethyl lactate/propionate mixture, and no significant methane production was observed in the dipropionate, LactOil™, and LactOil™/propionate microcosms. At 6 months, the headspace of the microcosms was removed along with accumulated ethene and methane. Between 6 and 7 months, methane production was again the highest in the whey powder (average 134 µM accumulated) microcosms, followed by ethyl lactate/propionate (average 58 µM accumulated), sodium lactate (average 21 µM accumulated), LactOil™ (average 18 µM accumulated), dipropionate (average 13 µM accumulated), and LactOil™/propionate (average 9 µM accumulated). No methane production was ever observed in the negative controls.

Utilization rates were calculated for all of the microcosm sets that performed efficient ARD of TCE to ethene. Whey powder exhibited the highest utilization rate, followed by sodium lactate, ethyl lactate/sodium propionate, and dipropionate. In comparison to sodium lactate, it appears that whey powder was more readily utilized as an electron donor. Conversely, dipropionate was less readily utilized and may be a more long-lived electron donor in the field.

The subject matter claimed is:

1. A method for enhancing in situ bioremediation of a nonaqueous halogenated solvent in ground water comprising adding to the ground water an amount of an electron donor sufficient for a halo-respiring microbe in the ground water to use the nonaqueous halogenated solvent as an electron acceptor, thereby reductively dehalogenating the nonaqueous halogenated solvent into innocuous compounds, wherein said electron donor comprises an aqueous solution of at least about 1% by weight of whey powder or equivalent of liquid whey.

2. The method of claim 1 wherein said microbe is indigenous to the ground water.

3. The method of claim 1 further comprising adding the halo-respiring microbe to the ground water.

4. The method of claim 1 wherein the halo-respiring microbe is a chloro-respiring microbe.

5. A method for enhancing mass transfer of a nonaqueous halogenated solvent present in a nonaqueous residual source of contamination in ground water, said ground water comprising an aqueous phase, into said aqueous phase comprising adding to said ground water an effective amount of a composition that donates electrons for microbe-mediated reductive dehalogenation of said nonaqueous halogenated solvent into innocuous compounds and functions as a surfactant or co-solvent for solubilizing said nonaqueous halogenated solvent, wherein said composition comprises an aqueous solution of at least about 1% by weight of whey powder or equivalent of liquid whey.

* * * * *